(12) United States Patent
Sumiya

(10) Patent No.: US 11,694,719 B2
(45) Date of Patent: Jul. 4, 2023

(54) CARTRIDGE MANAGEMENT DEVICE, CARTRIDGE MANAGEMENT SYSTEM, METHOD FOR OPERATING CARTRIDGE MANAGEMENT DEVICE, AND PROGRAM

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/810,640

(22) Filed: Jul. 5, 2022

(65) Prior Publication Data
US 2023/0068719 A1 Mar. 2, 2023

(30) Foreign Application Priority Data
Aug. 25, 2021 (JP) .................. 2021-137512

(51) Int. Cl.
*G11B 20/00* (2006.01)
*G11B 33/10* (2006.01)
*G11B 5/008* (2006.01)

(52) U.S. Cl.
CPC .... *G11B 20/00557* (2013.01); *G11B 5/00813* (2013.01); *G11B 33/10* (2013.01)

(58) Field of Classification Search
None
See application file for complete search history.

(56) References Cited

U.S. PATENT DOCUMENTS

| | | | | |
|---|---|---|---|---|
| 6,045,041 | A  * | 4/2000 | Tanaka | G06K 17/00 369/30.94 |
| 6,267,313 | B1* | 7/2001 | Saliba | G11B 23/087 |
| 2001/0044877 | A1* | 11/2001 | Kanazawa | G11B 27/11 711/170 |
| 2002/0114461 | A1* | 8/2002 | Shimada | G11B 20/00347 380/201 |
| 2004/0190179 | A1* | 9/2004 | Kato | G11B 27/328 |

(Continued)

FOREIGN PATENT DOCUMENTS

| | | |
|---|---|---|
| JP | 2003-132623 A | 5/2003 |
| JP | 2003-173656 A | 6/2003 |
| JP | 2008-511088 A | 4/2008 |

*Primary Examiner* — Peter Vincent Agustin
(74) *Attorney, Agent, or Firm* — Solaris Intellectual Property Group, PLLC

(57) ABSTRACT

A library controller including a storage executes first registration processing of, in a case where registration completion information indicating registration completion in a cartridge management system is not stored in a cartridge memory provided in a cartridge, registering identification information for identifying the cartridge and the registration completion information in the cartridge memory, overwriting prohibition processing of prohibiting overwriting to the identification information and the registration completion information registered in the cartridge memory, second registration processing of registering the identification information in the storage, and execution processing of executing reading and writing of user data from and to the cartridge in a case where the identification information stored in the storage coincides with the identification information stored in the cartridge memory.

12 Claims, 26 Drawing Sheets

(56) References Cited

U.S. PATENT DOCUMENTS

| | | | |
|---|---|---|---|
| 2005/0273632 A1* | 12/2005 | Kawakami | G11B 27/034 713/193 |
| 2007/0273519 A1* | 11/2007 | Ichikawa | G06K 17/0025 340/572.1 |
| 2009/0138726 A1 | 5/2009 | Brautigam et al. | |
| 2013/0145481 A1* | 6/2013 | Kozuka | G11B 20/0021 726/27 |
| 2023/0068719 A1* | 3/2023 | Sumiya | G11B 20/00557 |

* cited by examiner

| CARTRIDGE TABLE | | | ~34 |
|---|---|---|---|
| CARTRIDGE NUMBER | CELL NUMBER | USE FREQUENCY (TIMES) | |
| CN1 | A1 | 150 | |
| CN2 | A2 | 345 | |
| ⋮ | ⋮ | ⋮ | |
| - | E10 | 0 | |

| CARTRIDGE TABLE | | | ~34 |
|---|---|---|---|
| CARTRIDGE NUMBER | CELL NUMBER | USE FREQUENCY (TIMES) | |
| CN1 | A1 | 150 | |
| CN2 | A2 | 345 | |
| ⋮ | ⋮ | ⋮ | |
| CN100 | E10 | 0 | |

CARTRIDGE MANAGEMENT DEVICE, CARTRIDGE MANAGEMENT SYSTEM, METHOD FOR OPERATING CARTRIDGE MANAGEMENT DEVICE, AND PROGRAM

CROSS-REFERENCE TO RELATED APPLICATIONS

The present application claims priority under 35 U.S.C § 119 to Japanese Patent Application No. 2021-137512, filed on Aug. 25, 2021, which is hereby expressly incorporated by reference, in its entirety, into the present application.

BACKGROUND

Technical Field

A technique of the present disclosure relates to a cartridge management device, a cartridge management system, a method for operating a cartridge management device, and a program.

Related Art

JP2003-132623A discloses an information processing management device that determines whether or not to read data recorded in a recording medium following a comparison result of medium identification information acquired from the recording medium and target identification information with the medium identification information and the target identification information registered in advance.

JP2008-511088A discloses a control method that, in a case of performing writing of data to a data storage medium using a device, controls whether or not to permit writing of data to the device depending on data specific to the device is stored in a chip of the data storage medium.

JP2003-173656A discloses a control method that, in a case where a user uses a magnetic tape cartridge, permits the use of the magnetic tape cartridge in a case where fingerprint data stored in advance in a cartridge memory of the magnetic tape cartridge coincides with a fingerprint of the user.

SUMMARY

An embodiment according to the technique of the present disclosure provides a cartridge management device, a cartridge management system, a method for operating a cartridge management device, and a program capable of restraining unauthorized reuse of a magnetic tape cartridge.

A first aspect according to the technique of the present disclosure is a cartridge management device comprising a processor, and a first storage medium, in which the processor is configured to execute first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium, execute overwriting prohibition processing of prohibiting overwriting to the identification information and the registration completion information registered in the second storage medium through the first registration processing, execute second registration processing of registering the identification information in the first storage medium, and execute execution processing of executing at least one of reading or writing of user data from or to the magnetic tape cartridge in a case where the identification information stored in the first storage medium coincides with the identification information stored in the second storage medium.

A second aspect according to the technique of the present disclosure is the cartridge management device according to the first aspect in which the processor is configured to acquire the identification information from a mark given to a housing of the magnetic tape cartridge, and execute the first registration processing, the overwriting prohibition processing, the second registration processing, and the execution processing using the identification information acquired from the mark.

A third aspect according to the technique of the present disclosure is the cartridge management device according to the second aspect in which the mark is different for each cartridge management system.

A fourth aspect according to the technique of the present disclosure is the cartridge management device according to the first aspect in which the processor is configured to execute the first registration processing, the overwriting prohibition processing, the second registration processing, and the execution processing using the identification information issued by a manufacturer of the magnetic tape cartridge.

A fifth aspect according to the technique of the present disclosure is the cartridge management device according to the fourth aspect in which the processor is configured to execute the first registration processing, the overwriting prohibition processing, the second registration processing, and the execution processing using the identification information issued by the manufacturer of the magnetic tape cartridge through a communication line.

A sixth aspect according to the technique of the present disclosure is the cartridge management device according to any one of the first aspect to the fifth aspect in which the first registration processing includes processing of encrypting the identification information and registering the encrypted identification information in the second storage medium.

A seventh aspect according to the technique of the present disclosure is the cartridge management device according to any one of the first aspect to the fifth aspect in which the overwriting prohibition processing includes processing of encrypting the identification information and prohibiting overwriting to the encrypted identification information.

An eighth aspect according to the technique of the present disclosure is the cartridge management device according to any one of the first aspect to the seventh aspect in which the magnetic tape cartridge has a noncontact communication medium that is communicable with a communication device in a noncontact manner, and the second storage medium includes a memory mounted in the noncontact communication medium.

A ninth aspect according to the technique of the present disclosure is the cartridge management device according to any one of the first aspect to the eighth aspect in which a magnetic tape is housed in the magnetic tape cartridge, and the second storage medium includes a part of the magnetic tape.

A tenth aspect according to the technique of the present disclosure is a cartridge management system comprising the cartridge management device according to any one of the first aspect to the ninth aspect, and the magnetic tape cartridge.

An eleventh aspect according to the technique of the present disclosure is a method for operating a cartridge management system, the method comprising executing first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium, executing overwriting prohibition processing of prohibiting overwriting to the identification information and the registration completion information registered in the second storage medium through the first registration processing, executing second registration processing of registering the identification information in the first storage medium, and executing execution processing of executing at least one of reading or writing of user data from or to the magnetic tape cartridge in a case where the identification information stored in the first storage medium coincides with the identification information stored in the second storage medium.

A twelfth aspect according to the technique of the present disclosure is a program that causes a computer applied to a cartridge management system including a first storage medium to execute a process, the process comprising executing first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium, executing overwriting prohibition processing of prohibiting overwriting to the identification information and the registration completion information registered in the second storage medium through the first registration processing, executing second registration processing of registering the identification information in the first storage medium, and executing execution processing of executing at least one of reading or writing of user data from or to the magnetic tape cartridge in a case where the identification information stored in the first storage medium coincides with the identification information stored in the second storage medium.

DETAILED DESCRIPTION

Figure 1:
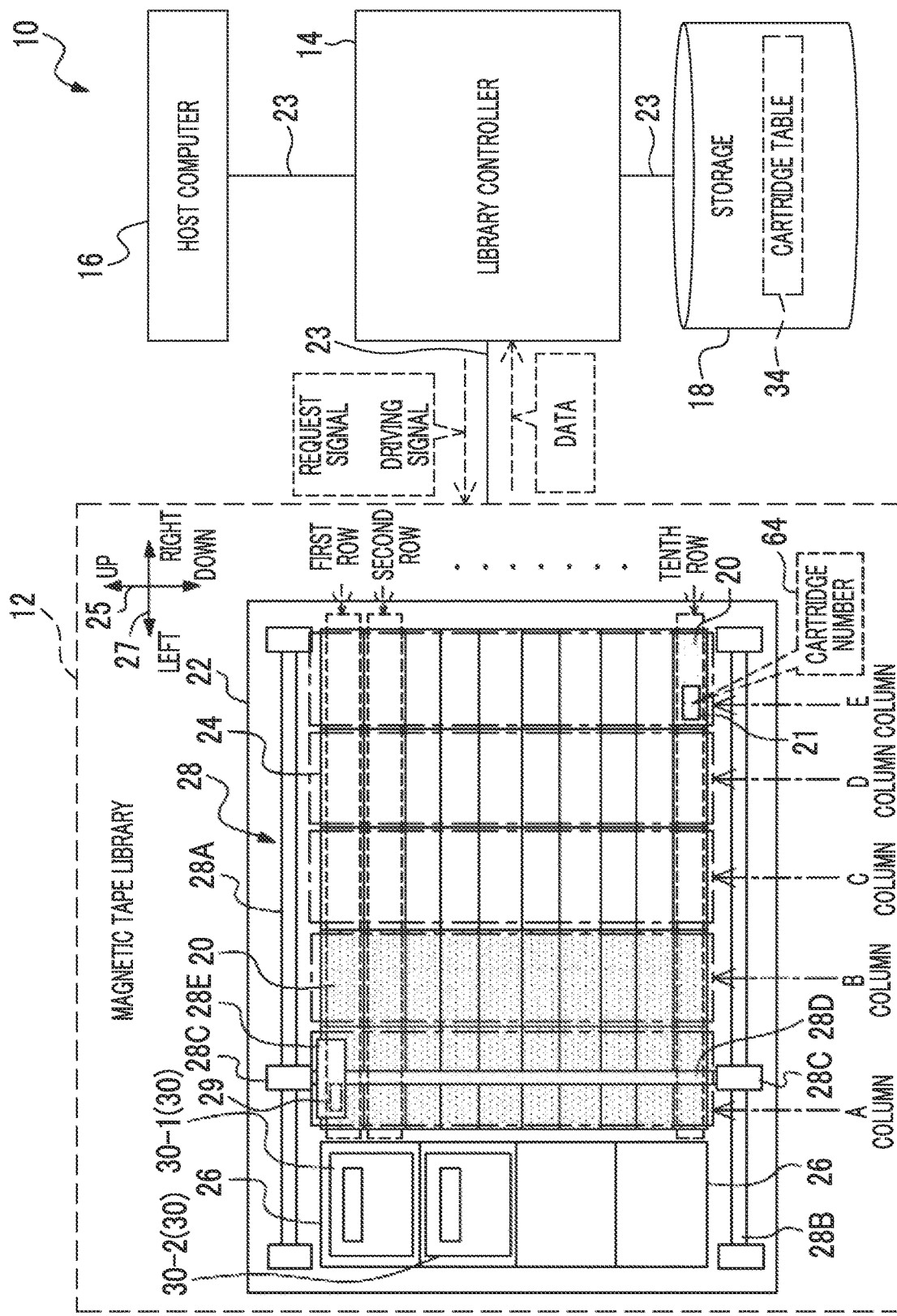
FIG. 1 is a diagram showing a hardware configuration example of a cartridge management system.

Hereinafter, an example of a cartridge management device, a cartridge management system, a method for operating a cartridge management device, and a program according to the technique of the present disclosure will be described referring to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". HDD is an abbreviation for "Hard Disk Drive". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". ID is an abbreviation for "Identification Data". BOT is an abbreviation for "Beginning Of Tape". EOT is an abbreviation for "End Of Tape". LAN is an abbreviation for "Local Area Network". WAN is an abbreviation for "Wide Area Network". SAN is an abbreviation for "Storage Area Network". NAS is an abbreviation for "Network Attached Storage". I/F is an abbreviation for "Interface". MFM is an abbreviation for "Magnetic Force Microscope". SEM is an abbreviation for "Scanning Electron Microscope". QR is an abbreviation for "Quick Response". ISO is an abbreviation for "International Organization for Standardization". ECMA is an abbreviation for "European Computer Manufacturers Association". EL is an abbreviation for "electroluminescent". LCD is an abbreviation for "Liquid Crystal Display". AES is an abbreviation for "Advanced Encryption Standard". FAX is an abbreviation for "facsimile". SNS is an abbreviation for "Social Networking Service". USB is an abbreviation for "Universal Serial Bus".

In the description of the specification, "parallel" indicates parallel in a meaning including an error that is generally allowed in the technical field to which the technique of the present disclosure belongs, and an error to such an extent not contrary to the spirit and scope of the technique of the present disclosure, in addition to completely parallel. In the description of the specification, "vertical" indicates vertical in a meaning including an error that is generally allowed in the technical field to which the technique of the present disclosure belongs, and an error to such an extent not contrary to the spirit and scope of the technique of the present disclosure, in addition to completely vertical. In the description of the specification, "perpendicular" indicates perpendicular in a meaning including an error that is generally allowed in the technical field to which the technique of the present disclosure belongs, and an error to such an extent not contrary to the spirit and scope of the technique of the present disclosure, in addition to completely perpendicular. In the description of the specification, "equal" indicates equal in a meaning including an error that is generally allowed in the technical field to which the technique of the present disclosure belongs, and an error to such an extent not contrary to the spirit and scope of the technique of the present disclosure, in addition to completely equal.

As shown in FIG. 1 as an example, a cartridge management system 10 comprises a magnetic tape library 12, a library controller 14, a host computer 16, and a storage 18. The cartridge management system 10 is an example of a "cartridge management system" according to the technique of the present disclosure.

The magnetic tape library 12 comprises a storage rack 22 that stores a plurality of magnetic tape cartridges 20 and one or more magnetic tape drives 30. The storage rack 22 is provided with a plurality of cartridge storage cells 24, a plurality of drive storage cells 26, and a transport mechanism 28. The magnetic tape cartridge 20 is an example of a "magnetic tape cartridge" according to the technique of the present disclosure. Hereinafter, for convenience of description, the magnetic tape cartridge 20 is described as a "cartridge 20".

Each cartridge storage cell 24 has, for example, a size capable of storing one cartridge 20, and a predetermined number (for example, one) of cartridges 20 are stored in each cartridge storage cell 24. The cartridge storage cells 24 are arranged in a lattice of, for example, 10 rows×5 columns. In the example shown in FIG. 1, although the cartridge storage cells 24 of 10 rows×5 columns are shown, this is merely an example, and it should suffice that the number of cartridge storage cells 24 is plural. In FIG. 1, although an example where the cartridge storage cells 24 are arranged in a lattice, this is merely an example, and other arrangement methods may be applied.

In FIG. 1, as indicated by a two-way arrow 25, a direction toward an upside of FIG. 1 is referred to as an up direction, and a direction toward a downside of FIG. 1 is referred to as a down direction. As indicated by a two-way arrow 27, a direction toward a left side of FIG. 1 is referred to as a left direction, and a direction toward a right side of FIG. 1 is referred to as a right direction.

In the example shown in FIG. 1, each row of the cartridge storage cell 24 is given a row number of 1 to 10 in order from the top in FIG. 1, and each column of the cartridge storage cell 24 is given a column symbol of A to E in order from the left in FIG. 1. With the row number of the column symbol, each cartridge storage cell 24 is given a cell name for identifying a position of the cartridge storage cell 24. For example, the cartridge storage cell 24 positioned in the A column and the first row is given a cell name "A1".

In the cartridge management system 10, in a pre-stage of processing of performing first readout of data from the cartridge 20 and/or writing of data to the cartridge 20, for security, there is a need to execute processing of permitting or prohibiting readout of data from the cartridge 20 and/or writing of data to the cartridge 20 for each cartridge 20. That is, in the cartridge management system 10, processing "registration" is executed as preprocessing of limiting readout of data from the cartridge 20 and/or writing of data to the cartridge 20 to only a specific user. The "registration" is performed for each cartridge. That is, each of a plurality of cartridges 20 is registered in the cartridge management system 10, such that, in the cartridge management system 10, readout of data from the registered cartridge 20 and/or writing of data to the cartridge 20 is permitted.

The registered cartridge 20 is the cartridge 20 where readout and/or writing of data can be performed in the cartridge management system 10. An unregistered cartridge 20 is a cartridge 20 where readout and/or writing of data cannot be yet performed in the cartridge management system 10. Data is encoded information.

For convenience of description, hereinafter, performing readout and/or writing of data with respect to cartridge 20 may be referred to as "performing reading and writing from and to the cartridge 20". That is, reading and writing of data from and to the cartridge 20 include at least one form of readout of data from the cartridge 20 or writing of data to the cartridge 20.

In the example shown in FIG. 1, the registered cartridges 20 are stored in 20 hatched cartridge storage cells 24 of the cell numbers "A1 to B10" one by one. In the example shown in FIG. 1, one unregistered cartridge 20 is stored in the hatched cartridge storage cell 24 of the cell number "E10".

In the example shown in FIG. 1, although the number of registered cartridges 20 is 20, this is merely an example, and the number of registered cartridges 20 may be any number. In the example shown in FIG. 1, although the number of unregistered cartridges 20 is one, this is merely an example, and the number of unregistered cartridges 20 may be any number. Hereinafter, for convenience of description, in a case where there is no need for distinction between the registered cartridge 20 and the unregistered cartridge 20, the registered cartridge 20 and the unregistered cartridge 20 are simply represented as "cartridges 20".

A magnetic tape MT is housed in each cartridge 20. The magnetic tape MT that is housed in each cartridge 20 has a data storage capacity for 2.5 T (tera), for example. Accordingly, the 20 cartridges 20 can store user data for a maximum of 50 T in total. The "user data" is information stored in the magnetic tape MT by a user, and indicates information that can be read out by the user. The user data is an example of "data". The user is a user who performs reading and writing of user data from and to the magnetic tape MT housed in the cartridge 20 using the cartridge management system 10.

A manager (hereinafter, simply referred to as a "manager") of the cartridge management system 10 allocates a mark 21 to each of the cartridges 20 (for example, the unregistered cartridge 20) stored in the cartridge storage cell 24. The manager stores the cartridge 20 allocated with the mark 21 in the cartridge storage cell 24.

The mark 21 includes various kinds of information regarding the unregistered cartridge 20. Various kinds of information regarding the cartridge 20 include a cartridge number 64. The cartridge number 64 is a number for identifying each of the cartridges 20 stored in the cartridge storage cell 24. That is, the cartridge number 64 indicates a number capable of specifying the cartridge 20. The cartridge number 64 is an example of "identification information" according to the embodiment.

Various kinds of information regarding the cartridge 20 include, for example, registration date and a registrant name, in addition to the cartridge number 64. The registration date indicates, for example, a date on which the registration of the cartridge 20 is performed to the cartridge management system 10. The registrant name indicates, for example, a name or an ID of a person who performs the registration of the cartridge 20 to the cartridge management system 10.

As the mark 21, for example, a two-dimensional barcode or a matrix type two-dimensional code is used; however, the technique of the present disclosure is not limited thereto, and for example, characters may be used as the mark 21. A representative example of the matrix type two-dimensional code includes a QR code (Registered Trademark). The mark 21 that is to be used is decided for each cartridge management system 10.

The mark 21 is different for each cartridge management system 10. In this case, for example, the manager may use the different mark 21 decided by the manager for each cartridge management system 10.

Here, although a form example where the mark 21 is different for each cartridge management system 10 is shown, this is merely an example, and the technique of the present disclosure is established, for example, even though the common mark 21 is used in a plurality of cartridge management systems 10. In this case, for example, the manager may use the mark 21 that is recommended by a manufacturer of the cartridge 20. The mark 21 does not need to be created following the published standard. The mark 21 may be created following a standard conforming to the published standard or may be created following a standard (for example, a standard not opened to the outside) developed independently by a provider of the cartridge management system 10.

The mark 21 may be printed directly on a housing of the cartridge 20. Alternatively, the mark 21 may be printed on an adhesive label and the label with the mark 21 printed may adhere to the housing of the cartridge. Alternatively, the mark 21 may be engraved in the housing of the cartridge 20. The work of attaching the mark 21 to the housing of the cartridge 20 is performed by, for example, the manager or a worker who is managed by the manager. The mark 21 printed on and engraved in the housing of the cartridge 20 and the mark 21 on the label adhered to the housing of the cartridge 20 are an example of "a mark given to a housing of a magnetic tape cartridge" according to the technique of the present disclosure.

The magnetic tape library 12 is provided with a mark reading sensor 29. In a case where a two-dimensional barcode or a matrix type two-dimensional code is used as the mark 21, a reading sensor in which an optical sensor (for example, an infrared sensor) is mounted is used as the mark reading sensor 29.

For convenience of description, in the example shown in FIG. 1, although the mark 21 is shown only on the unregistered cartridge 20 that is stored in the cartridge storage cell 24 of the cell number "E10", actually, the mark 21 is given to each of the registered cartridges 20 that are stored in the cartridge storage cells 24 of the cell numbers "A1 to B10". In the example shown in FIG. 1, the marks 21 that are given to the registered cartridges 20 are omitted.

One magnetic tape drive 30 is stored in each drive storage cell 26. In the example shown in FIG. 1, a first magnetic tape drive 30-1 is stored in the uppermost drive storage cell 26 among four drive storage cells 26 arranged in a vertical direction, and a second magnetic tape drive 30-2 is stored in a second uppermost drive storage cell 26. In the example shown in FIG. 1, although the number of drive storage cells 26 is four, the technique of the present disclosure is not limited, and the number of drive storage cells 26 may be one or more. In the following description, in a case where there is no need for distinction between the first magnetic tape drive 30-1 and the second magnetic tape drive 30-2, the first magnetic tape drive 30-1 and the second magnetic tape drive 30-2 are simply represented as "magnetic tape drives 30".

The cartridge 20 is loaded into the magnetic tape drive 30. The library controller 14 outputs a tape drive driving signal to the magnetic tape drive 30. The tape drive driving signal is an example of a driving signal that instructs the magnetic tape drive 30 to drive. The magnetic tape drive 30 drives the magnetic tape MT housed in the cartridge 20 in response to the tape drive driving signal.

The library controller 14 performs readout of data from the cartridge 20 by outputting a readout request signal to the magnetic tape drive 30. In the readout request signal, a data type to be a target for readout is designated. In a case where there is a need for distinguishing the readout request signal for description depending on a target to be a target for readout, a sign may be given at the back of a "readout request signal"; however, in a case where there is no need for distinguishing the target for readout, the readout request signal is simply represented to as the "readout request signal". The magnetic tape drive 30 reads data designated by the data type of the readout request signal from the magnetic tape MT of the loaded cartridge 20 or a storage device of the magnetic tape drive 30, and outputs data to the library controller 14.

The library controller 14 performs writing of data to the cartridge 20 by outputting a writing request signal to the magnetic tape drive 30. The writing request signal includes data that is to be written to the loaded cartridge 20. In a case where a data type of data to be written is distinguished for description, a sign may be given at the back of a "writing request signal"; however, in a case where there is no need for distinguishing the data type of data to be a target to be written, the writing request signal is simply represented as a "writing request signal". The magnetic tape drive 30 writes data designated by the writing request signal to the magnetic tape MT of the loaded cartridge 20 or the storage device of the magnetic tape drive 30.

The readout request signal and the writing request signal are an example of a request signal that is output from the library controller 14 to the magnetic tape library 12.

There are a plurality of kinds of request signals including the readout request signal and the writing request signal. Hereinafter, a plurality of kinds of request signals are collectively represented as a "request signal".

The transport mechanism 28 comprises an upper bar 28A, a lower bar 28B, a pair of horizontally movable robots 28C, a vertical bar 28D, and a vertically movable robot 28E. The upper bar 28A is fixed to an upper portion of the storage rack 22 to extend in a horizontal direction. The lower bar 28B is fixed to a lower portion of the storage rack 22 in parallel with the upper bar 28A.

A pair of horizontally movable robots 28C are attached to both ends of the vertical bar 28D. A pair of horizontally movable robots 28C is fitted to the upper bar 28A and the lower bar 28B. The horizontally movable robots 28C are self-propellable robots that can travel along the horizontal direction, and move the vertical bar 28D in the horizontal direction along the upper bar 28A and the lower bar 28B while maintaining the orientation of the vertical bar 28D vertically with respect to the orientations of the upper bar 28A and the lower bar 28B. The vertically movable robot 28E is attached to the vertical bar 28D. The vertically movable robot 28E is a self-propellable robot that can move along a vertical direction. That is, the vertically movable robot 28E moves in the vertical direction along the vertical bar 28D. The vertically movable robot 28E is provided with a gripping portion (not shown) for gripping the cartridge 20.

The mark reading sensor 29 is provided in the vertically movable robot 28E and reads the mark 21 given to the gripped cartridge 20. As described above, the mark 21 includes various kinds of information regarding the cartridge 20 starting from the cartridge number 64.

The library controller 14 outputs a transport mechanism driving signal to the transport mechanism 28. The transport mechanism driving signal is an example of a driving signal that instructs the transport mechanism 28 to drive. A motor (not shown) is mounted in each of the horizontally movable robots 28C and the vertically movable robot 28E, and the motor of each of the horizontally movable robots 28C and the vertically movable robot 28E is driven in response to the transport mechanism driving signal input from the library controller 14 to generate power. In the example shown in FIG. 1, a position where a part of the vertically movable robot 28E confronts the cartridge storage cell 24 of the cell number "A1" is set as a reference position, and the horizontally movable robots 28C and the vertically movable robot 28E are self-propelled using power generated by the motors in response to the transport mechanism driving signal input from the library controller 14.

The library controller 14 is connected to the magnetic tape library 12 to be communicable through a communication line 23. The library controller 14 integrally controls the transport mechanism 28 and the magnetic tape drive 30, and performs taking-out of the cartridge 20 from the cartridge storage cell 24, storage of the cartridge 20 in the cartridge storage cell 24, transport of the cartridge 20, loading of the cartridge 20 into the magnetic tape drive 30, taking-out of the cartridge 20 from the magnetic tape drive 30, registration of the cartridge 20 in the cartridge management system 10, readout of user data from the magnetic tape MT housed in the cartridge 20, writing of user data to the magnetic tape MT, and the like.

The host computer 16 is connected to the library controller 14 to be communicably through the communication line 23. The host computer 16 receives an instruction from the user and instructs the library controller 14 to perform readout of user data from the magnetic tape MT housed in the cartridge 20 and writing of user data to the magnetic tape MT.

The storage 18 is connected to the library controller 14 to be communicable through the communication line 23. A cartridge table 34 is stored in the storage 18. As the storage 18, for example, SAN and NAS are used.

The storage 18 is not necessarily separated from the library controller 14, and may be incorporated in the library controller 14. That is, the storage 18 functions as a storage medium in the library controller 14 regardless of a physical positional relationship between the storage 18 and the library controller 14. The storage 18 is an example of a "first storage medium" according to the technique of the present disclosure.

The communication line 23 may be any of a wired line or a wireless line. The cartridge management system 10 is constructed using, for example, a LAN, but may be constructed by combining at least one of a WAN or the Internet.

The library controller 14 registers an unregistered cartridge 20, makes the transport mechanism 28 take out a specific cartridge 20 from the cartridge storage cell 24, or makes the magnetic tape drive 30 read and write user data from and to the magnetic tape MT in the cartridge 20, under the control of the host computer 16.

Figure 2:
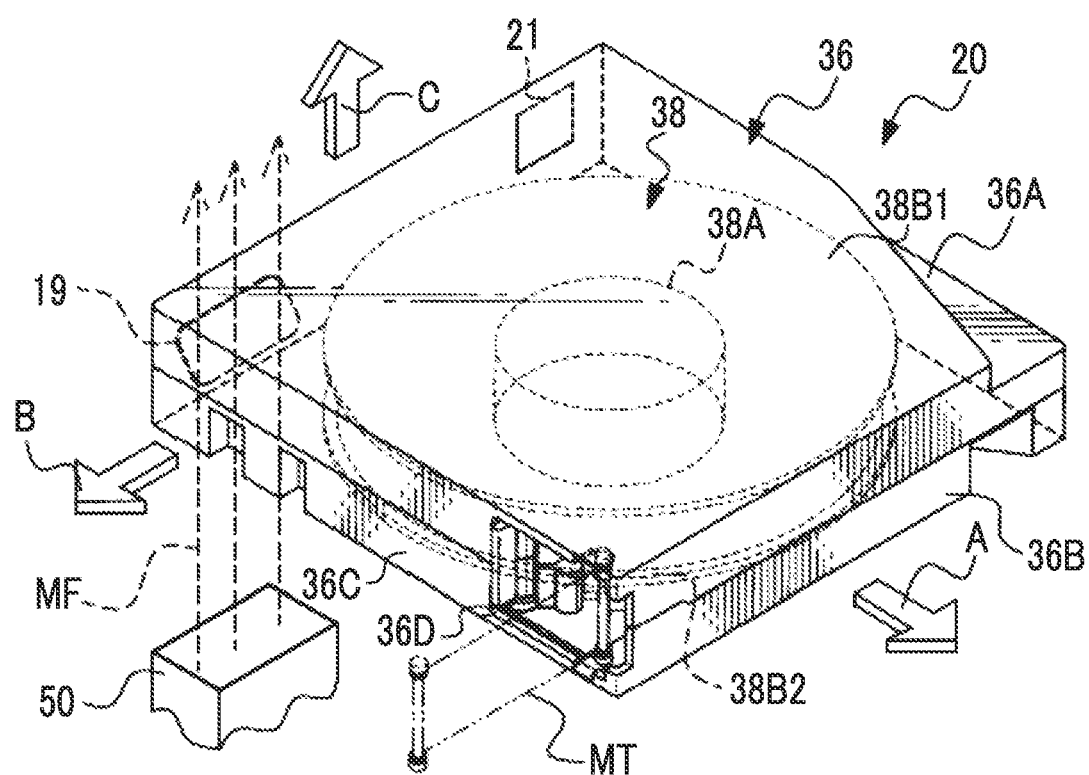
FIG. 2 is a diagram showing a hardware configuration example of a cartridge.

As shown in FIG. 2 as an example, the magnetic tape MT that stores user data is housed in the cartridge 20. In the following description, for convenience of description, in FIG. 2, a loading direction of the cartridge 20 into the magnetic tape drive 30 is indicated by an arrow A, an arrow A direction is referred to as a front direction of the cartridge 20, and a side in the front direction of the cartridge 20 is referred to as a front side of the cartridge 20. A direction opposite to the front direction of the cartridge 20 is referred to as a rear direction of the cartridge 20, and a side in the rear direction of the cartridge 20 is referred to as a rear side of the cartridge 20.

In the following direction, for convenience of description, in FIG. 2, an arrow B direction perpendicular to the arrow A direction is referred to as a right direction, and a side in the right direction of the cartridge 20 is referred to as a right side of the cartridge 20. A direction opposite to the right direction of the cartridge 20 is referred to as a left direction of the cartridge 20, and a side in the left direction of the cartridge 20 is referred to as a left side of the cartridge 20.

In the following description, for convenience of description, in FIG. 2, a direction perpendicular to the arrow A direction and the arrow B direction is indicated by an arrow C, an arrow C direction is referred to as an up direction of the cartridge 20, and a side in the up direction of the cartridge 20 is referred to as an upside of the cartridge 20. A direction opposite to the up direction of the cartridge 20 is referred to as a down direction of the cartridge 20, and a side in the down direction of the cartridge 20 is referred to as a downside of the cartridge 20.

As shown in FIG. 2 as an example, the cartridge 20 has a substantially rectangular shape in plan view, and comprises a box-shape case 36. The case 36 is formed of resin, such as polycarbonate, and comprises an upper case 36A and a lower case 36B. The upper case 36A and the lower case 36B are bonded by welding (for example, ultrasonic welding) and screwing in a state in which a lower peripheral edge surface of the upper case 36A and an upper peripheral edge surface of the lower case 36B are brought into contact with each other. A bonding method is not limited to welding and screwing, and other bonding methods may be used. The upper case 36A and the lower case 36B are an example of a "housing" of the cartridge 20 according to the technique of the present disclosure.

Inside the case 36, a cartridge reel 38 is rotatably housed. The cartridge reel 38 comprises a reel hub 38A, an upper flange 38B1, and a lower flange 38B2. The reel hub 38A is formed in a cylindrical shape. The reel hub 38A is a shaft center portion of the cartridge reel 38, has a shaft center direction along an up-down direction of the case 36, and is disposed in a center portion of the case 36. Each of the upper flange 38B1 and the lower flange 38B2 is formed in an annular shape. A center portion in plan view of the upper flange 38B1 is fixed to an upper end portion of the reel hub 38A, and a center portion in plan view of the lower flange 38B2 is fixed to a lower end portion of the reel hub 38A. The magnetic tape MT is wound around an outer peripheral surface of the reel hub 38A, and an end portion in a width direction of the magnetic tape MT is held by the upper flange 38B1 and the lower flange 38B2.

An opening 36D is formed on a front side of a right wall 36C of the case 36. The magnetic tape MT is pulled out from the opening 36D.

A noncontact reading and writing device 50 is disposed outside the cartridge 20. The cartridge 20 has a cartridge memory 19 as a noncontact communication medium that can perform communication with the noncontact reading and writing device 50 in a noncontact manner. In the example shown in FIG. 2, the cartridge memory 19 is provided in the lower case 36B of the cartridge 20. Specifically, the cartridge memory 19 is housed in a rear right end portion of the lower case 36B.

The noncontact reading and writing device 50 performs reading and writing of various kinds of information from and to the cartridge memory 19 in a noncontact manner. In the embodiment, a so-called passive type RFID tag is employed as the cartridge memory 19. For this reason, the cartridge memory 19 generates electric power with electromagnetic application to a magnetic field MF from the noncontact reading and writing device 50, and performs transfer of various kinds of information with respect to the noncontact reading and writing device 50 by performing communication with the noncontact reading and writing device 50 through the magnetic field MF using the generated electric power. A communication system of the noncontact reading and writing device 50 may be, for example, a system conforming to a known standard, such as ISO14443 or ISO18092, or may be a system conforming to the LTO specification of ECMA319. In the embodiment, the noncontact reading and writing device 50 is an example of a "communication device" according to the technique of the present disclosure, and the cartridge memory 19 is an example of a "noncontact communication medium" according to the technique of the present disclosure. The cartridge memory 19 is an example of a "second storage medium" according to the technique of the present disclosure.

Information regarding the cartridge 20 is stored in the cartridge memory 19. Information regarding the cartridge 20 indicates, for example, management information for managing the cartridge 20. The management information includes, for example, information regarding registration of the cartridge 20, identification information for use in identifying the cartridge 20, a storage capacity of the magnetic tape MT, the outline of user data stored in the magnetic tape MT, items of the user data, and information indicating a storage format of the user data. The management information is written to the cartridge memory 19 or read out from the cartridge memory 19 through noncontact communication between the cartridge memory 19 and the noncontact reading and writing device 50. The management information is an example of "data".

The mark 21 on which the cartridge number 64 is displayed is given to the rear side of the cartridge 20. A position of the mark 21 in the cartridge 20 is not limited thereto, and the mark 21 may be given to any position of the upside, the downside, the right side, the left side, or the front side of the cartridge 20. It is preferable that the mark 21 is given to a reading position where the mark reading sensor 29 in the vertically movable robot 28E reads the mark 21 in a case where the vertically movable robot 28E grips the cartridge 20.

Figure 3:
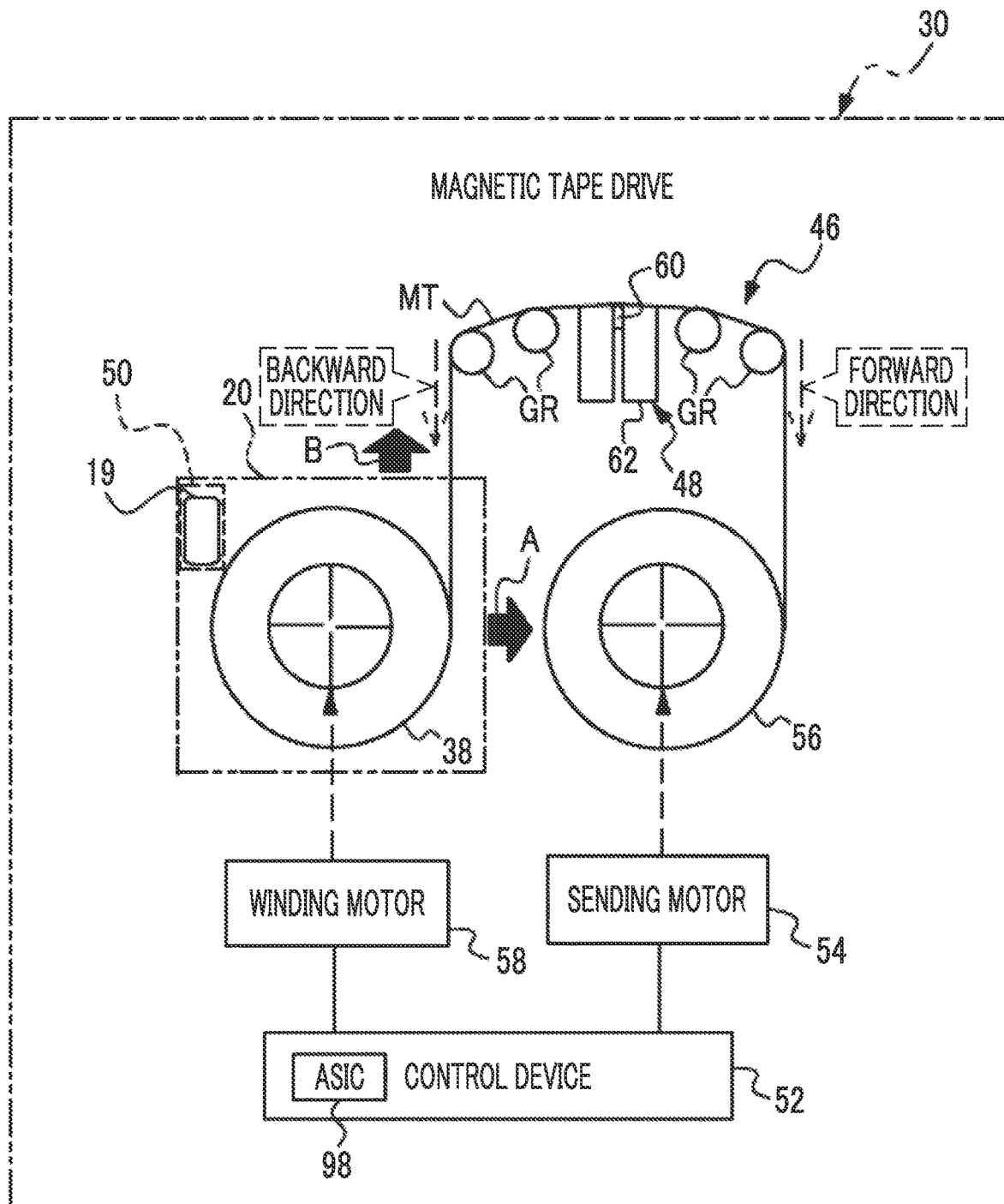
FIG. 3 is a diagram showing a hardware configuration example of a magnetic tape drive.

As shown in FIG. 3 as an example, the magnetic tape drive 30 comprises a transport device 46, a magnetic head 48, and a control device 52. The cartridge 20 is loaded into the magnetic tape drive 30. The magnetic tape drive 30 is a device that pulls out the magnetic tape MT from the cartridge 20 and performs reading and writing of user data from and to the pulled-out magnetic tape MT using the magnetic head 48.

The control device 52 controls the entire magnetic tape drive 30. In the embodiment, the control device 52 is realized by a device including an ASIC 98. This is merely an example, and for example, the control device 52 may be realized by an FPGA. Alternatively, the control device 52 may be realized by a computer including a CPU, a ROM, and a RAM. In addition, the control device 52 may be realized by combining two or more of the ASIC 98, an FPGA, and a computer. That is, the control device 52 may be realized by a combination of a hardware configuration and a software configuration.

The transport device 46 is a device that selectively transports the magnetic tape MT in a forward direction and a backward direction, and comprises a sending motor 54, a sending reel 56, a winding motor 58, and a plurality of guide rollers GR.

The sending motor 54 rotationally drives the sending reel 56 under the control of the control device 52. The control device 52 controls the sending motor 54 to control a rotation direction, a rotation speed, rotation torque, and the like of the sending reel 56.

In a case where the magnetic tape MT is pulled out to the sending reel 56, the sending motor 54 is rotated by the control device 52 such that the magnetic tape MT runs in the forward direction. A rotation speed, rotation torque, and the like of the sending motor 54 are adjusted depending on a speed of the magnetic tape MT that is pulled out to the sending reel 56.

The winding motor 58 rotationally drives the cartridge reel 38 in the cartridge 20 under the control of the control device 52. The control device 52 controls a winding motor 58 to control a rotation direction, a rotation speed, rotation torque, and the like of the cartridge reel 38.

In a case where the magnetic tape MT is wound around the cartridge reel 38, the winding motor 58 is rotated by the control device 52 such that the magnetic tape MT runs in the backward direction. A rotation speed, rotation torque, and the like of the winding motor 58 are adjusted depending on a speed of the magnetic tape MT that is wound around the cartridge reel 38.

The rotation speed, the rotation torque, and the like of each of the sending motor 54 and the winding motor 58 are adjusted in this manner, such that tension in a predetermined range is applied to the magnetic tape MT. A case where the tension is in the predetermined range indicates, for example, a range of tension obtained by a computer simulation and/or a test with a real machine as a range of tension in which user data can be read out from the magnetic tape MT and user data can be written to the magnetic tape MT with the magnetic head 48.

In the embodiment, although the rotation speed, the rotation torque, and the like of each of the sending motor 54 and the winding motor 58 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the magnetic head 48 between the cartridge 20 and the sending reel 56.

The magnetic head 48 comprises a reading and writing element 60 and a holder 62. The reading and writing element 60 is held by the holder 62 to be brought into contact with the running magnetic tape MT and performs reading and writing of user data from and to the magnetic tape MT that is transported by the transport device 46.

Figure 4:
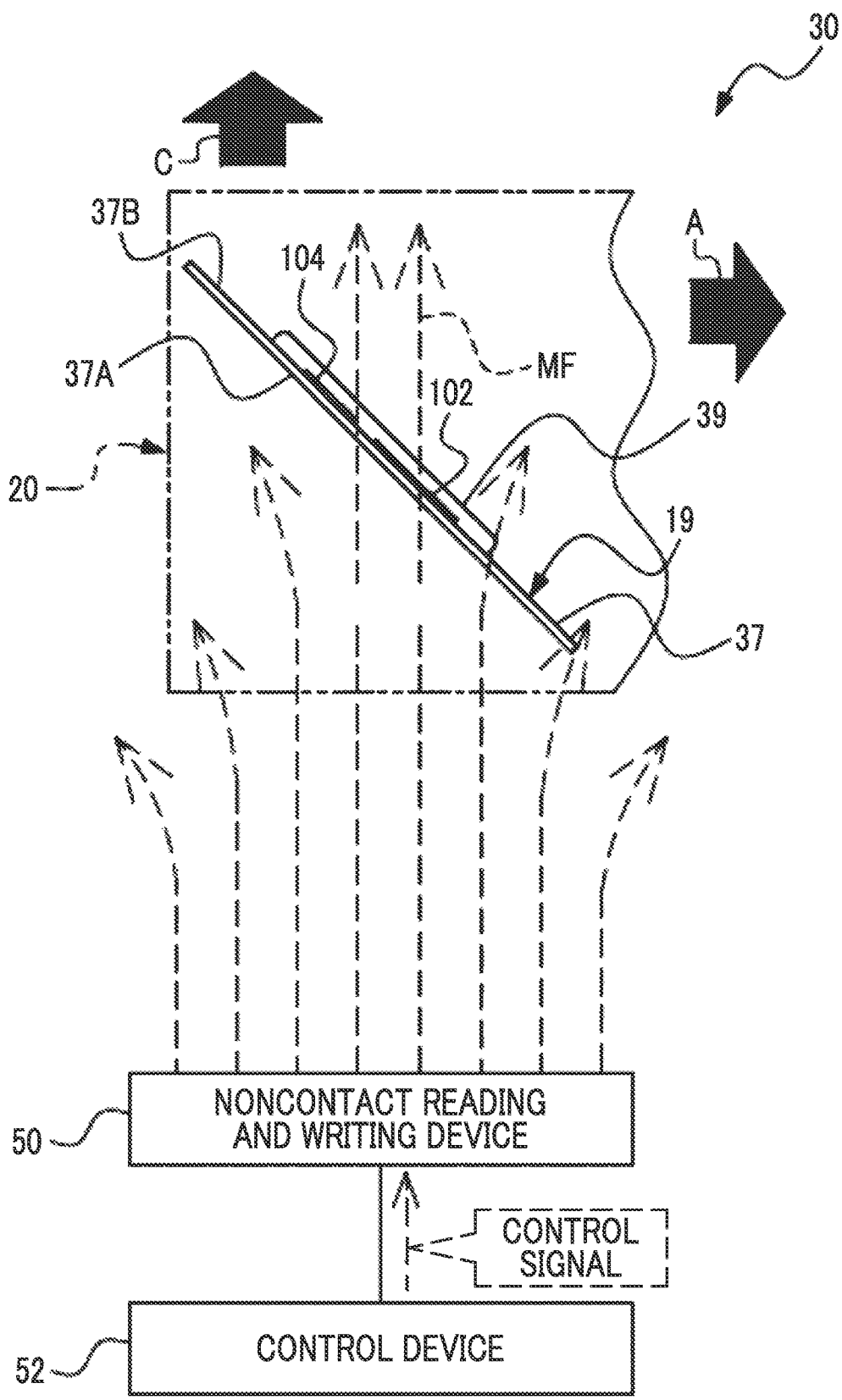
FIG. 4 is a schematic perspective view showing an example of an aspect where a magnetic field is discharged from a downside of a magnetic tape cartridge by a noncontact reading and writing device.

As shown in FIG. 4 as an example, the noncontact reading and writing device 50 is connected to the control device 52 of the magnetic tape drive 30.

The control device 52 outputs a control signal to the noncontact reading and writing device 50. The control signal is a signal for controlling the cartridge memory 19. The control device 52 outputs a control signal corresponding to a kind of a request signal output from the library controller 14 to the noncontact reading and writing device 50.

The noncontact reading and writing device 50 emits the magnetic field MF toward the cartridge memory 19 in response to the control signal input from the control device 52. The magnetic field MF passes through the cartridge memory 19 from a back surface 37A side to a front surface 37B side of a substrate 37.

The noncontact reading and writing device 50 performs noncontact communication with the cartridge memory 19 to give a command signal depending on the control signal to the cartridge memory 19. Specifically, the noncontact reading and writing device 50 spatially transmits the command signal to the cartridge memory 19 under the control of the control device 52. Although details will be described below, the command signal is a signal indicating a command to the cartridge memory 19.

In a case where the command signal is spatially transmitted from the noncontact reading and writing device 50 to the cartridge memory 19, a command signal depending on an instruction from the control device 52 is included in the magnetic field MF by the noncontact reading and writing device 50. In other words, the command signal is superimposed on the magnetic field MF by the noncontact reading and writing device 50. That is, the noncontact reading and writing device 50 transmits the command signal to the cartridge memory 19 through the magnetic field MF under the control of the control device 52.

An IC chip 102 and a capacitor 104 are mounted on the front surface 37B of the cartridge memory 19. The IC chip 102 and the capacitor 104 are bonded to the front surface 37B. The IC chip 102 and the capacitor 104 are sealed with a sealing material 39 on the front surface 37B of the cartridge memory 19. Here, as the sealing material 39, ultraviolet curable resin that is cured with reaction to ultraviolet light is employed. The ultraviolet curable resin is merely an example, and photocurable resin that is cured with reaction to light in a wavelength range other than ultraviolet light may be used as the sealing material 39, thermosetting resin may be used as the sealing material 39, or other adhesives may be used as the sealing material 39.

Figure 5:
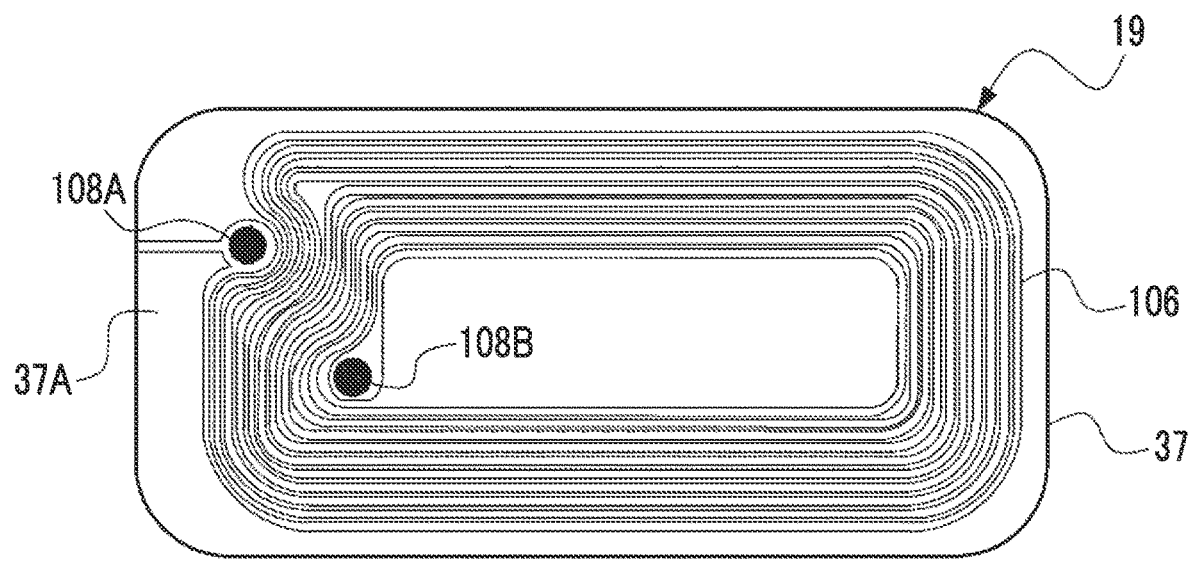
FIG. 5 is a schematic bottom view showing an example of a structure of a back surface of a substrate of a cartridge memory in the magnetic tape cartridge.

As shown in FIG. 5 as an example, a coil 106 is formed in a loop shape on the back surface 37A of the cartridge memory 19. Here, as a material of the coil 106, copper foil is employed. The copper foil is merely an example, and for example, other kinds of conductive materials, such as aluminum foil, may be used. The coil 106 induces an induced current with application of the magnetic field MF from the noncontact reading and writing device 50.

A first conduction portion 108A and a second conduction portion 108B are provided on the back surface 37A of the cartridge memory 19. The first conduction portion 108A and the second conduction portion 108B have solder and electrically connect both end portions of the coil 106 to the IC chip 102 and the capacitor 104 on the front surface 37B.

Figure 6:
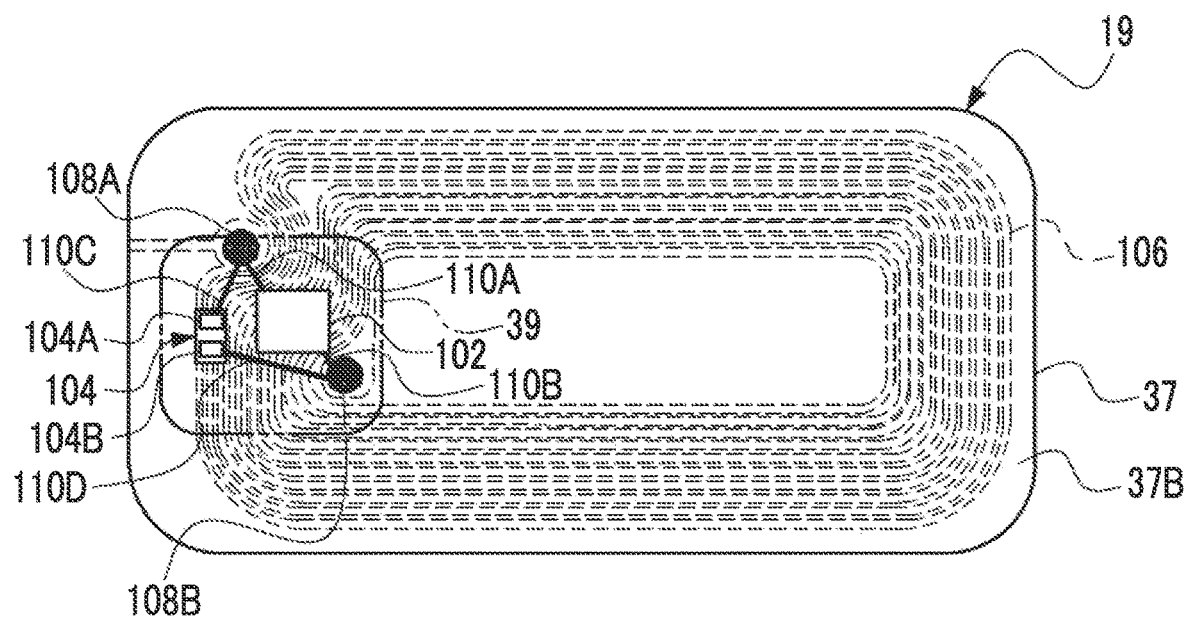
FIG. 6 is a schematic plan view showing an example of a structure of a front surface of the substrate of the cartridge memory in the magnetic tape cartridge.

As shown in FIG. 6 as an example, the IC chip 102 and the capacitor 104 are electrically connected using a wire connection method on the front surface 37B of the cartridge memory 19. Specifically, one terminal of a positive electrode terminal and a negative electrode terminal of the IC chip 102 is connected to the first conduction portion 108A through wire 110A, and the other terminal is connected to the second conduction portion 108B through a wire 110B. The capacitor 104 has a pair of electrodes. In the example shown in FIG. 6, a pair of electrodes is electrodes 104A and 104B. The electrode 104A is connected to the first conduction portion 108A through a wire 110C, and the electrode 104B is connected to the second conduction portion 108B through a wire 110D. With this, the IC chip 102 and the capacitor 104 are connected to the coil 106 in parallel.

Figure 7:
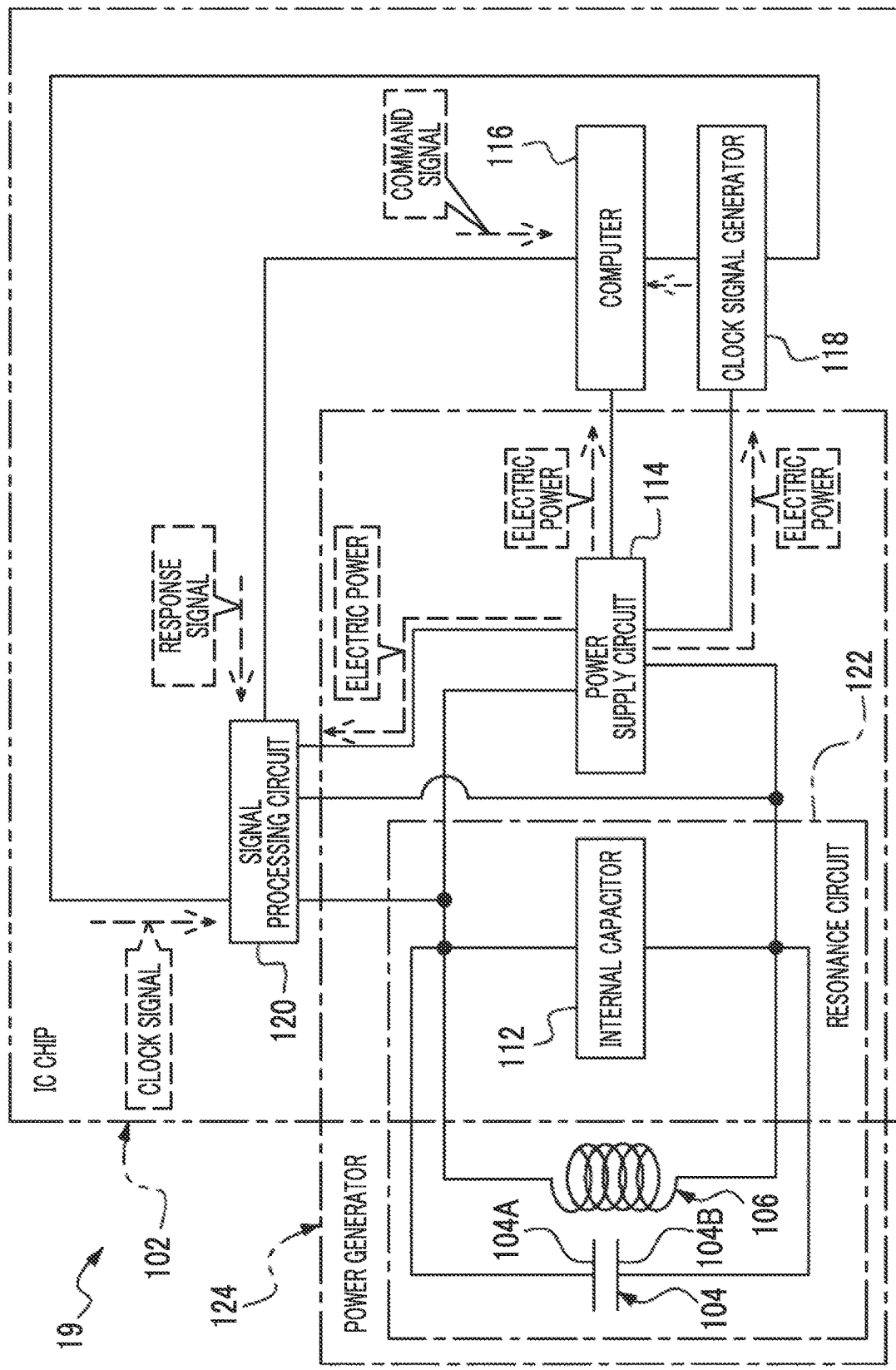
FIG. 7 is a schematic circuit diagram showing an example of the circuit configuration of the cartridge memory in the magnetic tape cartridge.

As shown in FIG. 7 as an example, the IC chip 102 comprises an internal capacitor 112, a power supply circuit 114, a computer 116, a clock signal generator 118, and a signal processing circuit 120. The IC chip 102 is a general-use IC chip that is usable for purposes other than the cartridge 20.

The cartridge memory 19 comprises a power generator 124. The power generator 124 generates electric power with application of the magnetic field MF from the noncontact reading and writing device 50 to the coil 106. Specifically, the power generator 124 generates alternating-current electric power using a resonance circuit 122, converts the generated alternating-current electric power into direct-current electric power, and outputs the direct-current electric power.

The power generator 124 has the resonance circuit 122 and the power supply circuit 114. The resonance circuit 122 comprises the capacitor 104, the coil 106, and the internal capacitor 112. The internal capacitor 112 is a capacitor that is incorporated in the IC chip 102, and the power supply circuit 114 is also a circuit that is incorporated in the IC chip 102. The internal capacitor 112 is connected to the coil 106 in parallel.

The capacitor 104 is a capacitor externally attached to the IC chip 102. The IC chip 102 is a general-use IC chip that is intrinsically usable for purposes different from the cartridge 20. For this reason, the capacitance of the internal capacitor 112 may not be enough to realize a resonance frequency required for the cartridge memory 19 used in the cartridge 20. Accordingly, in the cartridge memory 19, the capacitor 104 is post-attached to the IC chip 102 as a capacitor having a capacitance value necessary in making the resonance circuit 122 resonate at a predetermined resonance frequency with the application of the magnetic field MF. The predetermined resonance frequency is a frequency (for example, 13.56 MHz) corresponding to a frequency of the magnetic field MF and is appropriately decided depending on the specification or the like of the cartridge memory 19 and/or the noncontact reading and writing device 50. The capacitance of the capacitor 104 is determined based on a measured value of the capacitance of the internal capacitor 112. Here, although a form example where the capacitor 104 is externally attached has been described, the technique of the present disclosure is not limited thereto, and the capacitor 104 may be incorporated in the IC chip 102 in advance.

The resonance circuit 122 generates alternating-current electric power by causing a resonance phenomenon of the predetermined resonance frequency using the induced current induced by the coil 106 with the magnetic field MF passing through the coil 106, and outputs the generated alternating-current electric power to the power supply circuit 114.

The power supply circuit 114 has a rectification circuit and a smoothing circuit. The rectification circuit is a full-wave rectification circuit having a plurality of diodes. The full-wave rectification circuit is merely an example, and a half-wave rectification circuit may be used. The smoothing circuit includes a capacitor and a resistor. The power supply circuit 114 converts the alternating-current electric power input from the resonance circuit 122 into direct-current electric power and supplies the converted direct-current electric power (hereinafter, simply referred to as "electric power") to various drive elements in the IC chip 102. Examples of various drive elements include the computer 116, the clock signal generator 118, and the signal processing circuit 120. In this way, electric power is supplied to various drive elements in the IC chip 102 by the power generator 124, such that the IC chip 102 operates using electric power generated by the power generator 124.

The computer 116 controls the operation of the entire cartridge memory 19. The clock signal generator 118 generates a clock signal and outputs the clock signal to the signal processing circuit 120 and the like. The signal processing circuit 120 and the like operate in response to the clock signal input from the clock signal generator 118. The clock signal generator 118 changes a frequency of the clock signal in response to an instruction of the computer 116.

The signal processing circuit 120 is connected to the resonance circuit 122. The signal processing circuit 120 has a decoding circuit (not shown) and an encoding circuit (not shown). The decoding circuit of the signal processing circuit 120 extracts and decodes the command signal from the magnetic field MF received by the coil 106 and outputs the command signal to the computer 116. The computer 116 outputs a response signal to the command signal to the signal processing circuit 120. That is, the computer 116 executes processing depending on the command signal input from the signal processing circuit 120 and outputs a processing result as the response signal to the signal processing circuit 120. In a case where the response signal is input from the computer 116, the encoding circuit of the signal processing circuit 120 modulates the response signal through encoding and outputs the response signal to the resonance circuit 122. The resonance circuit 122 transmits the response signal input from the encoding circuit of the signal processing circuit 120 to the noncontact reading and writing device 50 through the magnetic field MF.

Figure 8:
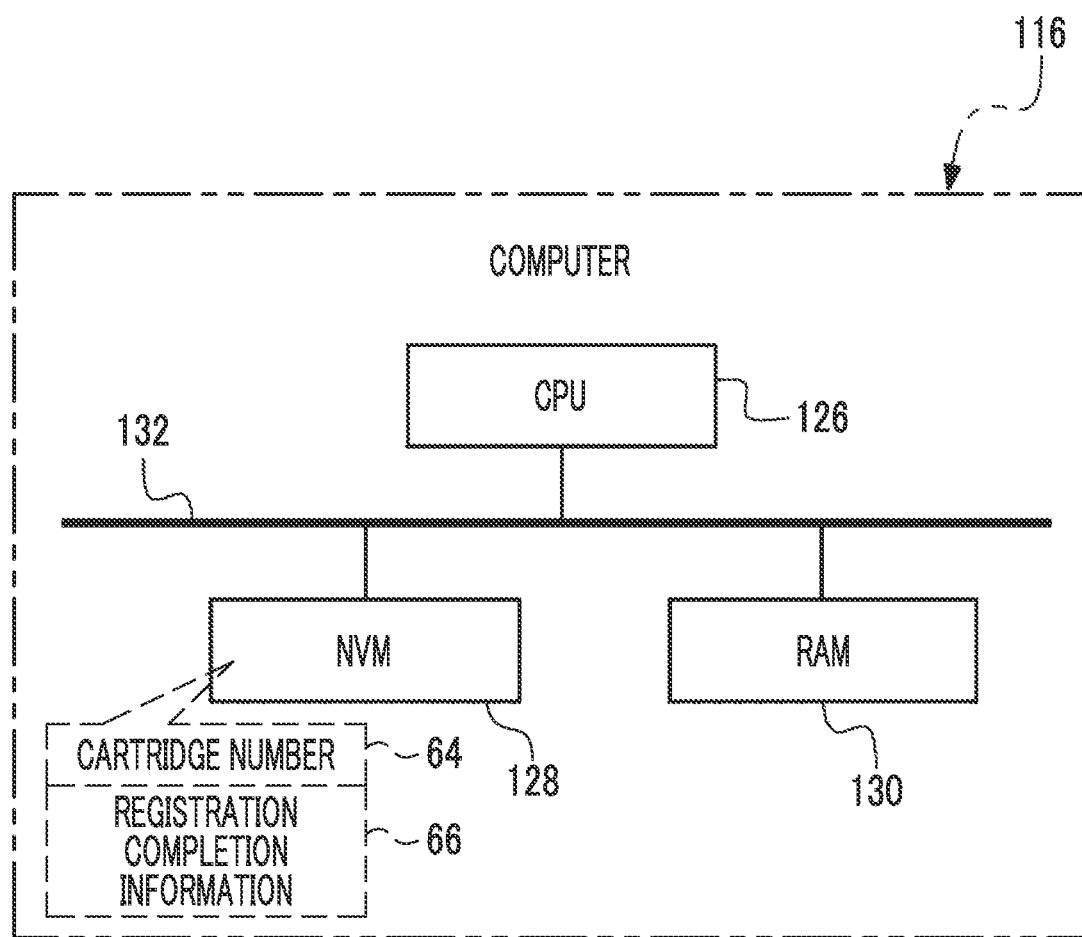
FIG. 8 is a block diagram showing an example of the hardware configuration of an electric system in a computer configured with an IC chip mounted on the cartridge memory of the magnetic tape cartridge.

As shown in FIG. 8 as an example, the computer 116 comprises a CPU 126, an NVM 128, and a RAM 130. The CPU 126, the NVM 128, and the RAM 130 are connected to a bus 132.

The CPU 126 controls the operation of the computer 116. The NVM 128 is an example of "a memory mounted in a noncontact communication medium" according to the technique of the present disclosure. An example of the NVM 128 is an EEPROM. The EEPROM is merely an example, and a ferroelectric memory may be used instead of the EEPROM. Any nonvolatile memory may be used as long as such a memory can be mounted in the IC chip 102. The management information and the like are stored in the NVM 128. The RAM 130 temporarily stores various kinds of information and is used as a work memory. An example of the RAM 130 is a DRAM or an SRAM.

The CPU 126 selectively executes polling processing, registration processing, access processing, and the like in response to the command signal input from the signal processing circuit 120. The polling processing is processing of establishing communication between the noncontact reading and writing device 50 and is executed as preparation processing in a pre-stage of the registration processing and the access processing, for example. The registration processing indicates processing of registering an unregistered cartridge 20 in the cartridge management system 10. Through the registration processing, the cartridge number 64 allocated to the cartridge 20 registered in the cartridge management system 10 and registration completion information 66 indicating that the cartridge 20 is registered in the cartridge management system 10 are stored in the NVM 128 of the cartridge 20 registered in the cartridge management system 10. The registration completion information 66 is information that is stored in only the NVM 128 of the cartridge 20 registered in the cartridge management system 10. The access processing of the user data to the cartridge 20 indicates processing of performing readout of the user data from the magnetic tape MT of the cartridge 20 and/or writing of the user data to the magnetic tape MT of the cartridge 20.

With the above-described configuration, the cartridge management system 10 manages a plurality of cartridges 20 each of which houses the magnetic tape MT. In a case where a registration request signal is received from the host computer 16, in a pre-stage of the access processing of the user data to the cartridge 20, the library controller 14 executes the registration processing of registering an unregistered cartridge 20 in the cartridge management system 10 following a flow of processing shown in FIG. 9 as an example. The registration request signal is an example of a request signal that is output from the host computer 16 to the library controller 14. Hereinafter, the registration processing of registering the unregistered cartridge 20 in the cartridge management system 10 is referred to as "registration processing on an unregistered cartridge 20".

Figure 9:
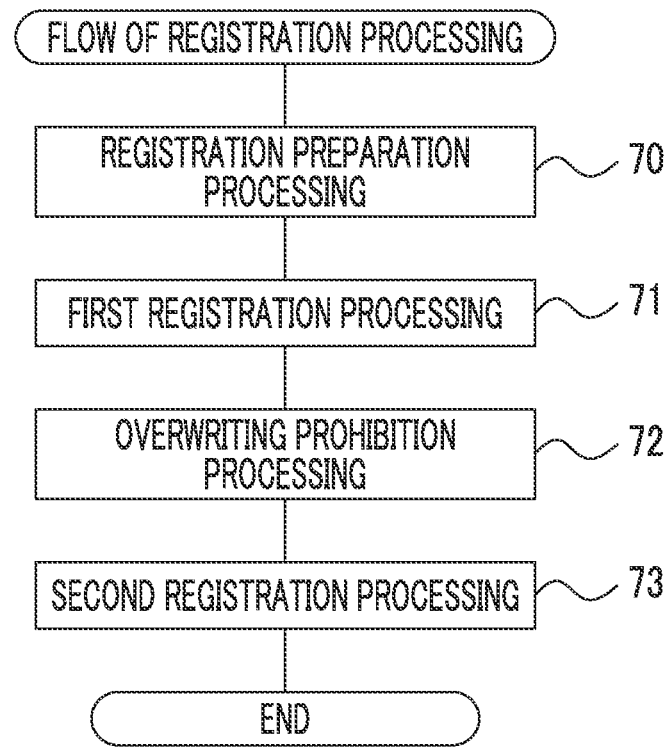
FIG. 9 is a flowchart illustrating an example of a flow of registration processing.

As shown in FIG. 9 as an example, in a case of executing the registration processing on the unregistered cartridge 20, the cartridge management system 10 executes registration preparation processing 70, first registration processing 71, overwriting prohibition processing 72, and second registration processing 73 under the control of the library controller 14.

The registration preparation processing 70 is processing of taking out the cartridge 20 to be registered from the cartridge storage cell 24 using the transport mechanism 28 and loading the cartridge 20 into the magnetic tape drive 30 in response to the registration request signal received from the host computer 16. The first registration processing 71 is processing of storing the cartridge number 64 and the registration completion information 66 in the NVM 128 depending on a storage situation of the registration completion information 66 in the NVM 128 of the cartridge memory 19. The overwriting prohibition processing 72 is processing of prohibiting overwriting to the cartridge number 64 and the registration completion information 66 stored in the NVM 128. The second registration processing 73 is processing of storing the cartridge number 64 of the registered cartridge 20 in the cartridge table 34 of the storage 18. An aspect where information is stored in a storage medium, such as the storage 18, the NVM 128, or the magnetic tape MT of the cartridge 20 is an example of "register" according to the technique of the present disclosure.

After the registration processing on the unregistered cartridge 20 ends, the access processing of the user data to the cartridge 20 is possible.

Figure 10:
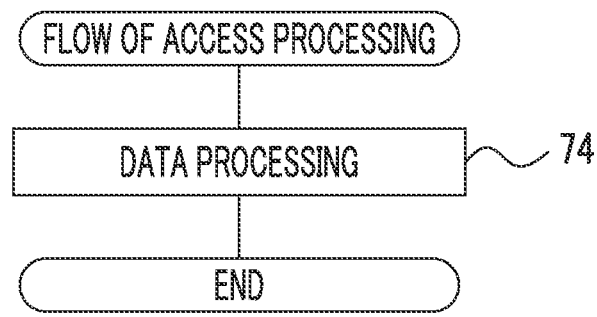
FIG. 10 is a flowchart illustrating an example of a flow of access processing.

As shown in FIG. 10 as an example, in a case of executing the access processing to the cartridge 20, the cartridge management system 10 executes data processing 74 under the control of the library controller 14.

The data processing 74 is processing of executing reading and writing of the user data designated by the readout request signal and/or the writing request signal from and to the magnetic tape MT of the cartridge 20 designated by the readout request signal and/or the writing request signal from the host computer 16. The data processing 74 is an example of "execution processing" according to the technique of the present disclosure.

Next, the configuration of the cartridge management system 10 including the library controller 14 that executes the registration preparation processing 70, the first registration processing 71, the overwriting prohibition processing 72, the second registration processing 73, and the data processing 74 will be described. The library controller 14 is an example of a "cartridge management device" according to the technique of the present disclosure.

Figure 11:
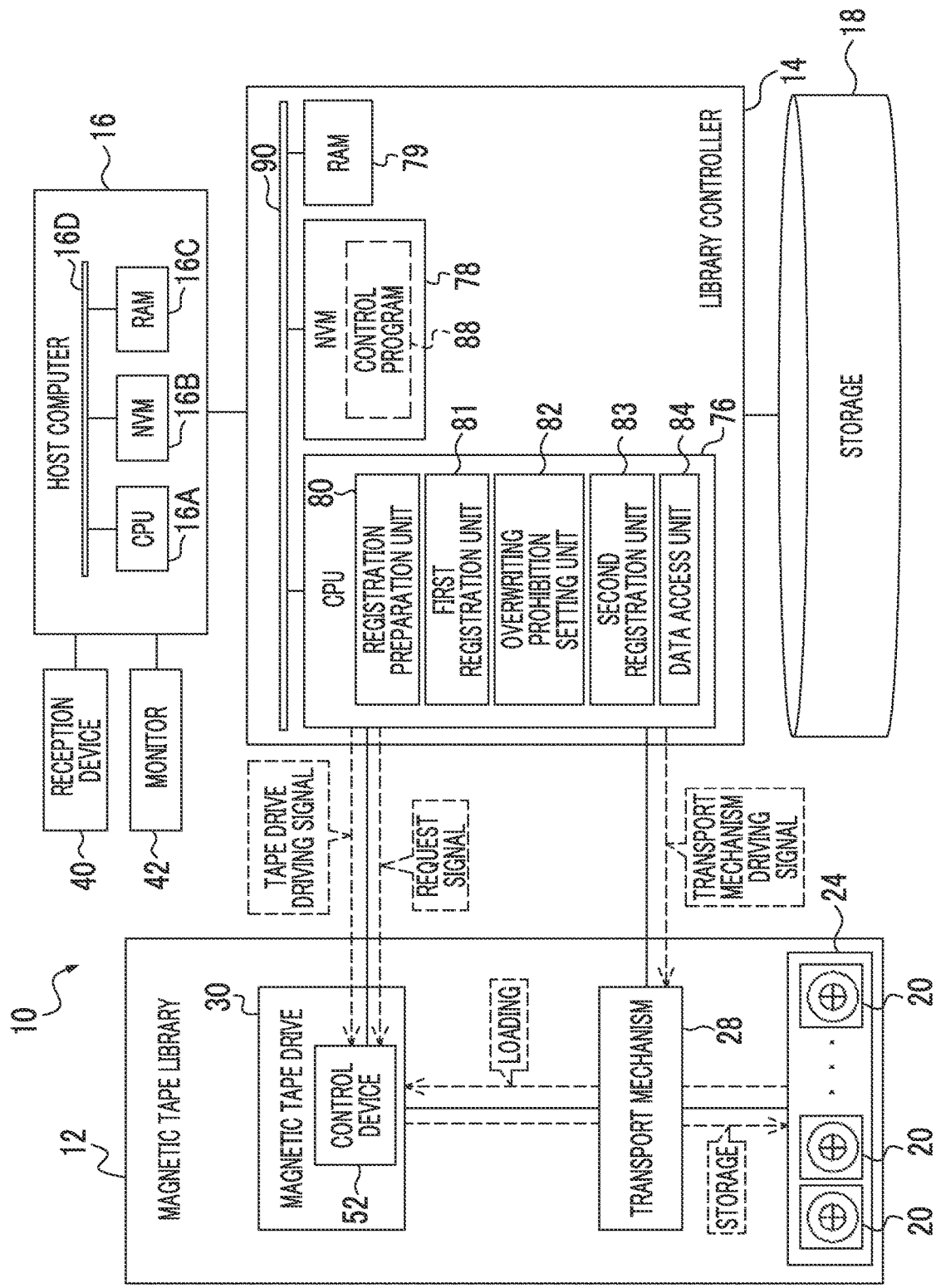
FIG. 11 is a diagram showing a hardware configuration example of a library controller.

As shown in FIG. 11 as an example, the library controller 14 comprises a CPU 76, an NVM 78, and a RAM 79. The CPU 76, the NVM 78, and the RAM 79 are connected to a bus 90.

The CPU 76 is an example of a "processor" according to the technique of the present disclosure. The CPU 76 controls the entire cartridge management system 10. An example of the NVM 78 is an EEPROM. The EEPROM is merely an example, and for example, a ferroelectric memory may be used instead of the EEPROM. Any nonvolatile memory may be used as long as such a memory can be mounted in the library controller 14. The RAM 79 is a volatile memory that is used as a work area or the like at the time of execution of various programs.

The CPU 76 outputs the transport mechanism driving signal to the transport mechanism 28. The transport mechanism 28 moves the horizontally movable robots 28C and the vertically movable robot 28E in response to the transport mechanism driving signal input from the CPU 76. The vertically movable robot 28E selectively performs a loading operation to take out the cartridge 20 from the cartridge storage cell 24 as a movement destination and to load the taken-out cartridge 20 into the magnetic tape drive 30 and a storage operation to take out the cartridge 20 loaded into the magnetic tape drive 30 from the magnetic tape drive 30 and to store the taken-out cartridge 20 in the original cartridge storage cell 24. In a case where the drive of the transport mechanism 28 based on the transport mechanism driving signal ends, the transport mechanism 28 returns to the reference position again.

The CPU 76 outputs a request signal to the magnetic tape drive 30. The magnetic tape drive 30 executes processing requested by the request signal input from the CPU 76.

The CPU 76 outputs the tape drive driving signal to the magnetic tape drive 30. The control device 52 of the magnetic tape drive 30 selectively performs a readout operation to read out the user data from the magnetic tape MT and a write operation to write the user data to the magnetic tape MT by controlling the transport device 46 and the magnetic head 48 in response to the tape drive driving signal input from the CPU 76.

A control program 88 is stored in the NVM 78. The CPU 76 reads out the control program 88 from the NVM 78 and executes the control program 88 on the RAM 79, thereby functioning as a registration preparation unit 80, a first registration unit 81, an overwriting prohibition setting unit 82, a second registration unit 83, and a data access unit 84. The registration preparation unit 80 executes the registration preparation processing 70. The first registration unit 81 executes the first registration processing 71. The overwriting prohibition setting unit 82 executes the overwriting prohibition processing 72. The second registration unit 83 executes the second registration processing 73. The data access unit 84 executes the data processing 74. The control program 88 is an example of a program according to the technique of the present disclosure.

The host computer 16 gives an instruction depending on a user's request to the library controller 14. The host computer 16 comprises a CPU 16A, an NVM 16B, and a RAM 16C. The CPU 16A controls the entire host computer 16. The NVM 16B is a nonvolatile memory. Various programs are stored in the NVM 16B. An example of the NVM 16B is an EEPROM, but the technique of the present disclosure is not limited thereto. The NVM 16B may be, for example, a ferroelectric memory instead of the EEPROM, and any volatile memory may be used as long as such a memory can be mounted in the host computer 16. The RAM 16C is a volatile memory that is used as a work area or the like at the time of execution of various programs.

The CPU 16A, the NVM 16B, and the RAM 16C are connected to a bus 16D. For example, a reception device 40 including, for example, a mouse, a keyboard, and a touch panel, and a monitor 42 including, for example, an EL display or an LCD, is connected to the host computer 16. The reception device 40 receives an instruction from the manager and the user with respect to the host computer 16. The monitor 42 displays an output from the host computer 16 on a screen. Here, although the reception device 40 and the monitor 42 are shown as independent devices, the technique of the present disclosure is not limited thereto, and an input/output device in which the reception device 40 and the monitor 42 are integrated may be applied. Examples of the input/output device include a touch panel included in the reception device 40 and a touch panel display in which the monitor 42 is integrated.

Figure 12:
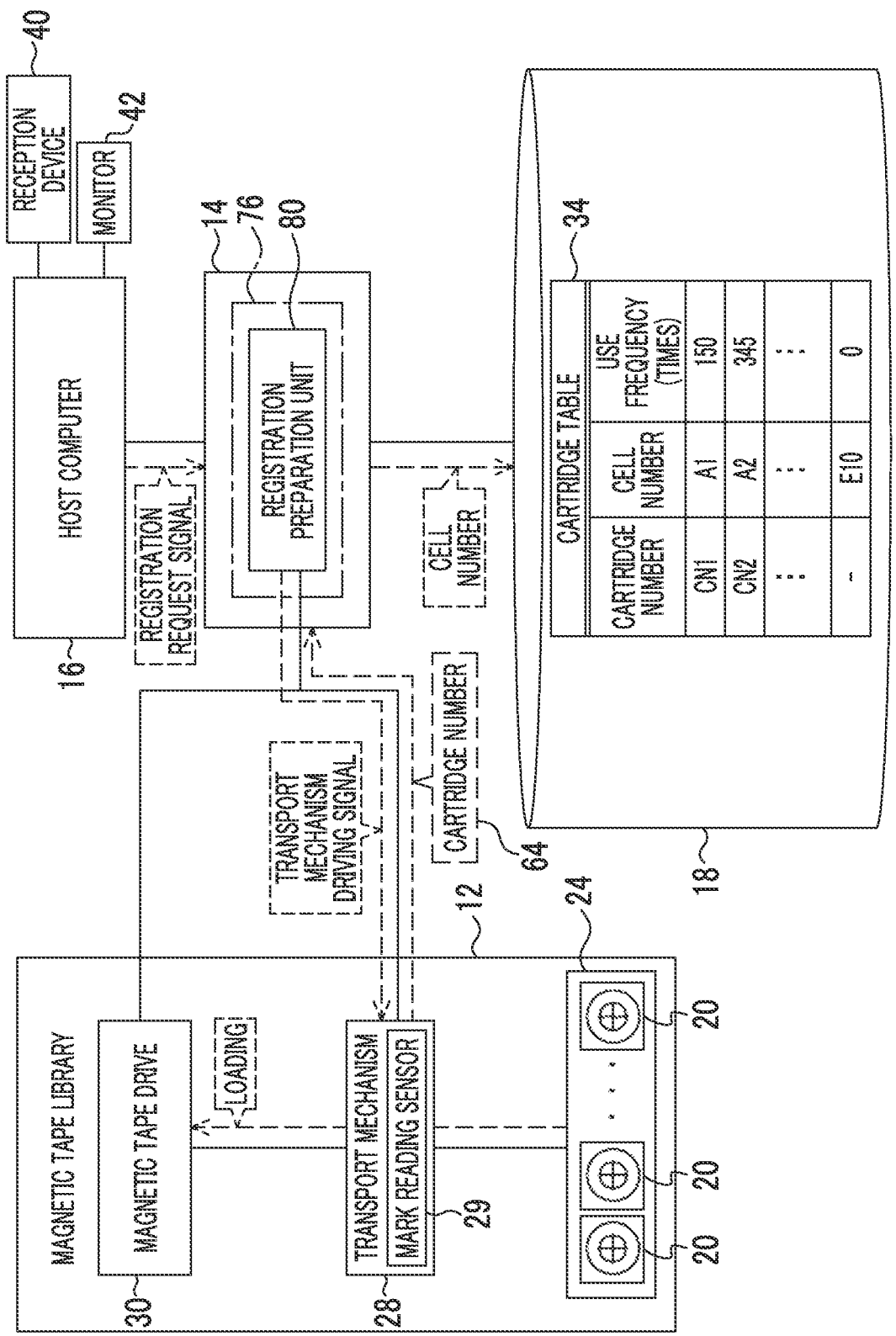
FIG. 12 is a block diagram showing an example of registration preparation processing by a registration preparation unit.

As shown in FIG. 12 as an example, the registration preparation unit 80 executes the registration preparation processing 70 in response to the registration request signal input from the host computer 16.

For example, the host computer 16 outputs the registration request signal to the library controller 14 in response to an instruction of the manager who operates the reception device 40. The registration request signal includes information capable of specifying an unregistered cartridge 20 designated as a registration target. Specifically, the manager first allocates the cartridge number 64 to the unregistered cartridge 20 to be a registration target in the cartridge management system 10 and gives the marks 21 representing the cartridge number 64 to the case 36 of the unregistered cartridge 20. Then, the manager stores the unregistered cartridge 20 given the mark 21 in the empty cartridge storage cell 24 where any cartridge 20 is not yet stored. The storage of the unregistered cartridge 20 in the cartridge storage cell 24 may be performed by the hands of the manager or may be performed by the manager operating the reception device 40 to output the transport mechanism driving signal from the library controller 14 to the transport mechanism 28.

The cell number of the cartridge storage cell 24 where the unregistered cartridge 20 is stored is received by the reception device 40, such that the registration request signal including the cell number is generated by the host computer 16. Here, as an example, in a case where it is assumed that the unregistered cartridge 20 is stored in the cartridge storage cell 24 of the cell number "E10", the host computer 16 generates the registration request signal including the cell number of the cartridge storage cell 24 where the cartridge 20 as a registration target is stored, and outputs the generated registration request signal to the registration preparation unit 80.

A cartridge table 34 is stored in the storage 18. The cartridge table 34 stores the cartridge number 64 of the cartridge 20, the cell number of the cartridge storage cell 24 where the cartridge 20 is stored, and a use frequency of the cartridge 20 in association with one another. The use frequency of the cartridge 20 is the number of times in which reading and writing of the user data from and to the cartridge 20 are performed.

In a case where the registration request signal is received from the host computer 16, the registration preparation unit 80 adds the cell number included in the registration request signal, that is, the cell number (in this case, as an example, "E10") where the cartridge 20 as a registration target is stored, to the cartridge table 34 in the storage 18.

In a stage where the cell number is added to the cartridge table 34, the cartridge number 64 of the cartridge 20 as a registration target is unclear. Thus, the cartridge number 64 is not set in the cartridge table 34. Instead, for example, "–" is set in a cartridge number field of the cartridge table 34 associated with the cell number. "–" is a symbol representing that a value of the cartridge number field is not set.

In the stage where the cell number is added to the cartridge table 34, in the cartridge management system 10, reading and writing of the user data to the cartridge 20 as a registration target is not yet performed even once. In this case, "0" is set in a use frequency field of the cartridge table 34 associated with the cell number.

The registration preparation unit 80 outputs the transport mechanism driving signal including the cell number of the cartridge storage cell 24 where the cartridge 20 as a registration target is stored, to the transport mechanism 28. The transport mechanism 28 performs the loading operation in response to the transport mechanism driving signal input from the registration preparation unit 80. With this, the cartridge 20 as a registration target is taken out from the cartridge storage cell 24 of the magnetic tape library 12 designated by the cell number included in the transport mechanism driving signal and is loaded into the magnetic tape drive 30.

In a case where the cartridge 20 is taken out from the cartridge storage cell 24 and is loaded into the magnetic tape drive 30, the mark 21 of the cartridge 20 is read by the mark reading sensor 29.

The mark reading sensor 29 outputs the cartridge number 64 read from the mark 21 given to the cartridge 20 as a registration target, to the library controller 14.

Figure 13:
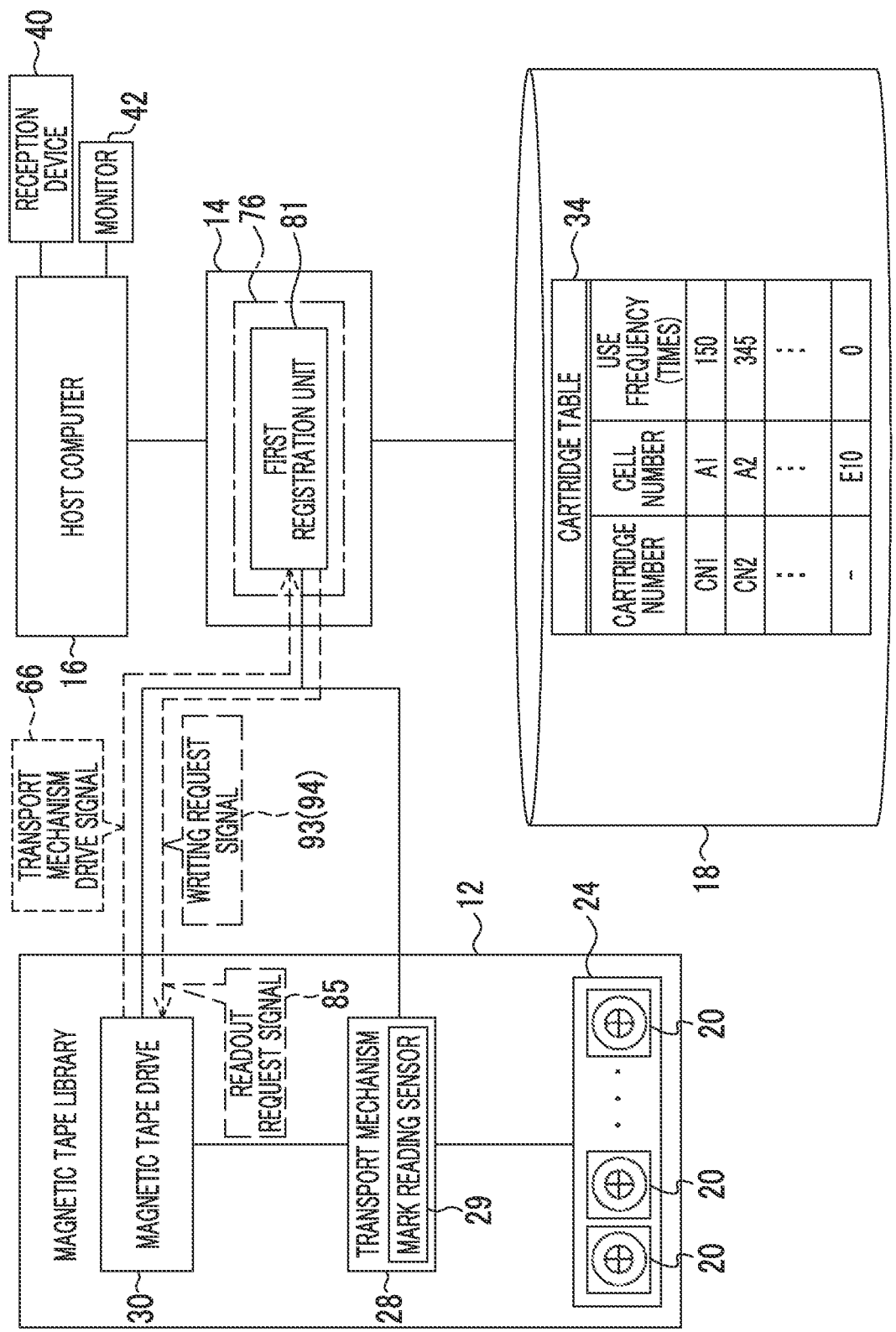
FIG. 13 is a block diagram showing an example of first registration processing by a first registration unit.

As shown in FIG. 13 as an example, in a case where the library controller 14 receives the cartridge number 64 from the mark reading sensor 29, the first registration unit 81 executes the first registration processing 71.

To determine whether or not the registration completion information 66 is stored in the NVM 128 incorporated in the cartridge 20 as a registration target, the first registration unit 81 outputs a readout request signal 85 in which the registration completion information 66 is a target for readout, to the magnetic tape drive 30 into which the cartridge 20 is loaded.

In a case where the registration completion information 66 is stored in the NVM 128 of the cartridge 20, this represents that the cartridge 20 is already registered in the cartridge management system 10. On the other hand, in a case where the registration completion information 66 is not stored in the NVM 128 of the cartridge 20, this represents that the cartridge 20 is not registered in the cartridge management system 10.

A data structure of the registration completion information 66 is not limited, and predefined registration completion information 66 is used. The registration completion information 66 may be defined for each cartridge management system 10 by the manager, for example. That is, the content of the registration completion information 66 may be different for each cartridge management system 10.

In a case where the registration completion information 66 is stored in the NVM 128, the magnetic tape drive 30 outputs the registration completion information 66 read out from the NVM 128, to the first registration unit 81. On the other hand, in a case where the registration completion information 66 is not stored in the NVM 128, the magnetic tape drive 30 does not output the registration completion information 66 to the first registration unit 81. In a case where the registration completion information 66 is not stored in the NVM 128, the magnetic tape drive 30 may output information representing that the registration completion information 66 is not stored, to the first registration unit 81.

In a case where the registration completion information 66 is not stored in the NVM 128, the cartridge 20 that is loaded into the magnetic tape drive 30 is an unregistered cartridge 20 that is not yet registered in the cartridge management system 10.

Accordingly, in a case where the registration completion information 66 is not stored in the NVM 128, the first registration unit 81 outputs a writing request signal 93 for requesting to write the cartridge number 64 to the NVM 128 and a writing request signal 94 for requesting to write the registration completion information 66 to the NVM 128, to the magnetic tape drive 30. A case where the registration completion information 66 is not stored in the NVM 128 refers to a case where the first registration unit 81 does not receive the registration completion information 66 from the magnetic tape drive 30 or a case where information representing that the registration completion information 66 is not stored in the NVM 128 is received from the magnetic tape drive 30.

The cartridge number 64 that is written to the NVM 128 by the first registration unit 81 is the cartridge number 64 of the cartridge 20 read by the mark reading sensor 29, that is, the cartridge number 64 of the cartridge 20 loaded into the magnetic tape drive 30. The cartridge number 64 stored in the NVM 128 is an example of "identification information stored in a second storage medium" according to the technique of the present disclosure.

On the other hand, in a case where the registration completion information 66 is stored in the NVM 128, this means that the cartridge 20 loaded into the magnetic tape drive 30 is the cartridge 20 that is already registered in the cartridge management system 10.

In a case where the registration completion information 66 is stored in the NVM 128, the first registration unit 81 does not transmit the writing request signal 93 and the writing request signal 94 to the magnetic tape drive 30. With this, writing of the cartridge number 64 and the registration completion information 66 to the NVM 128 is not performed. That is, the cartridge number 64 and the registration completion information 66 that are already stored in the NVM 128 are held in the NVM 128 without change.

Figure 14:
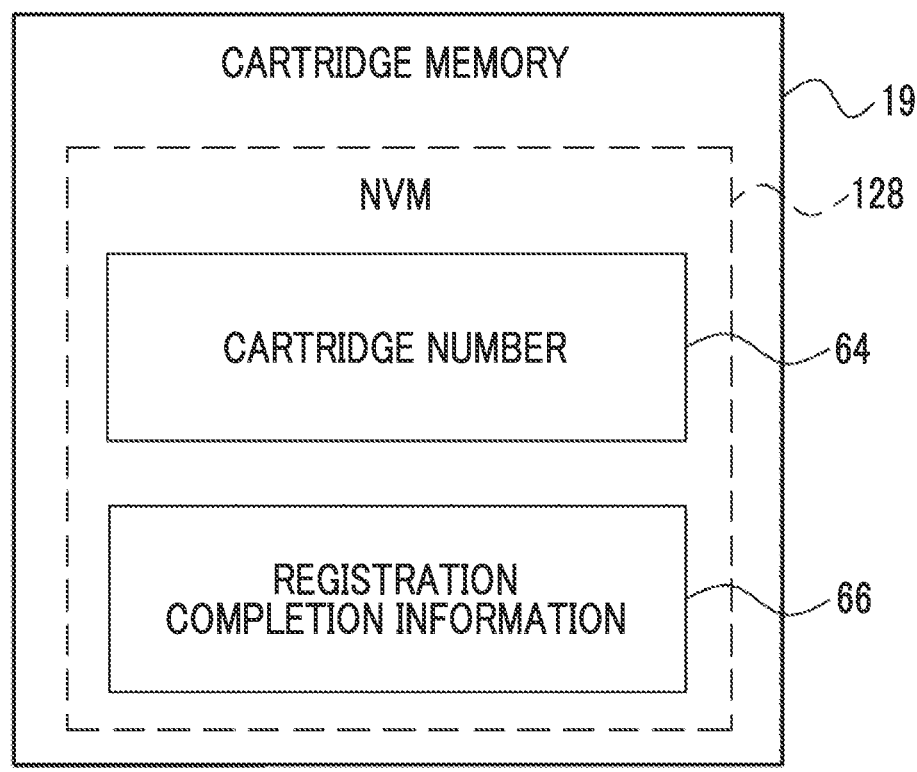
FIG. 14 is a diagram showing an example of information that is stored in the cartridge memory.

In a case where the registration completion information 66 is not stored in the NVM 128, the first registration processing 71 is executed, such that, as shown in FIG. 14 as an example, the registration completion information 66 and the cartridge number 64 allocated to the cartridge 20 by the manager are stored in the NVM 128 of the cartridge 20 loaded into the magnetic tape drive 30.

Figure 15:
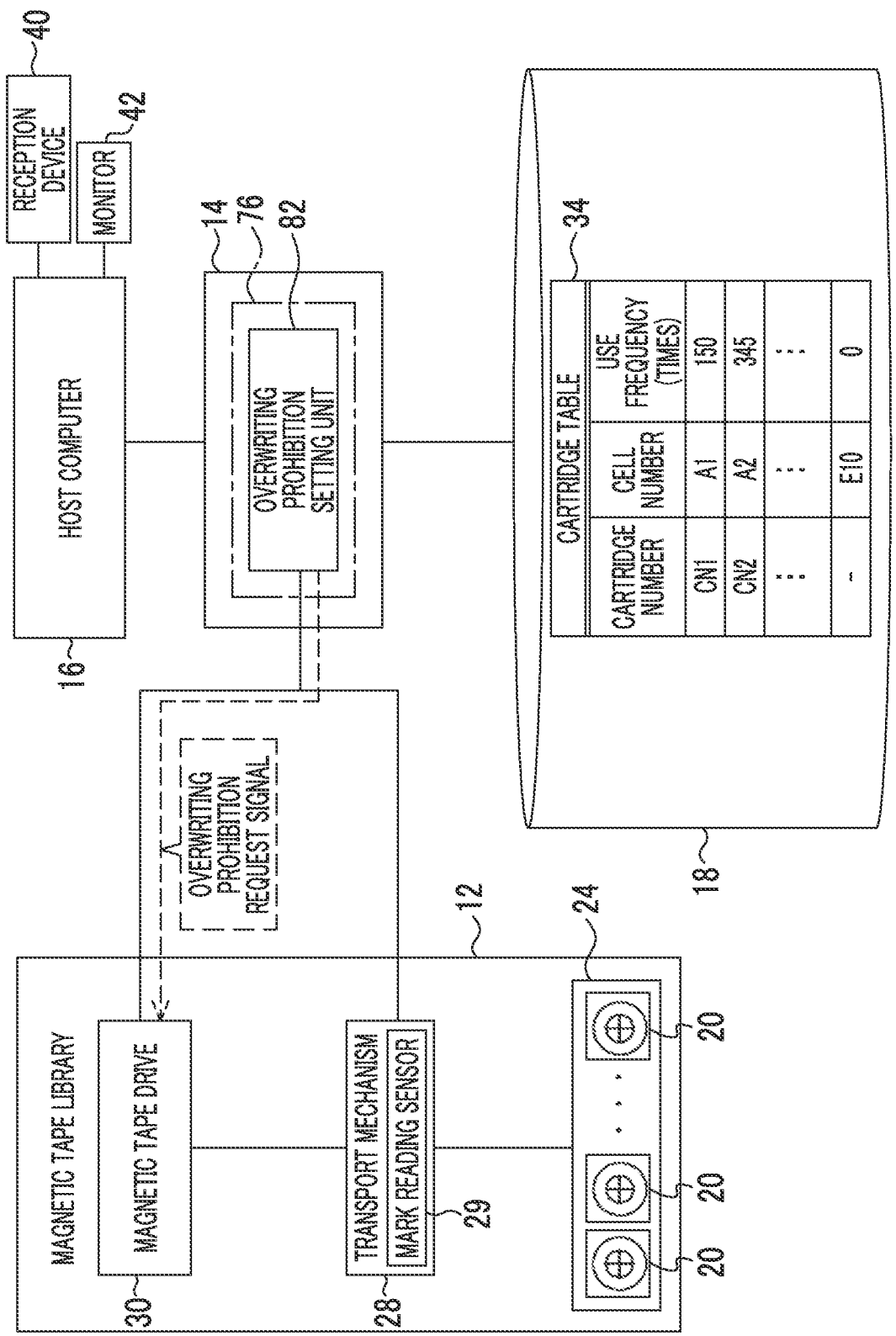
FIG. 15 is a block diagram showing an example of overwriting prohibition processing by an overwriting prohibition setting unit.

After the first registration processing 71 ends, as shown in FIG. 15 as an example, the overwriting prohibition setting unit 82 executes the overwriting prohibition processing 72.

In regard to data stored in the NVM 128, readout of data, deletion of data, and change of data can be performed. Accordingly, the overwriting prohibition setting unit 82 outputs an overwriting prohibition request signal for setting the cartridge number 64 and the registration completion information 66 stored in the NVM 128 through the first registration processing 71 to overwriting prohibition, to the magnetic tape drive 30. A case where data is set to overwriting prohibition refers to a state in which readout of data is possible, but deletion of data and change of data are prohibited.

Figure 16:
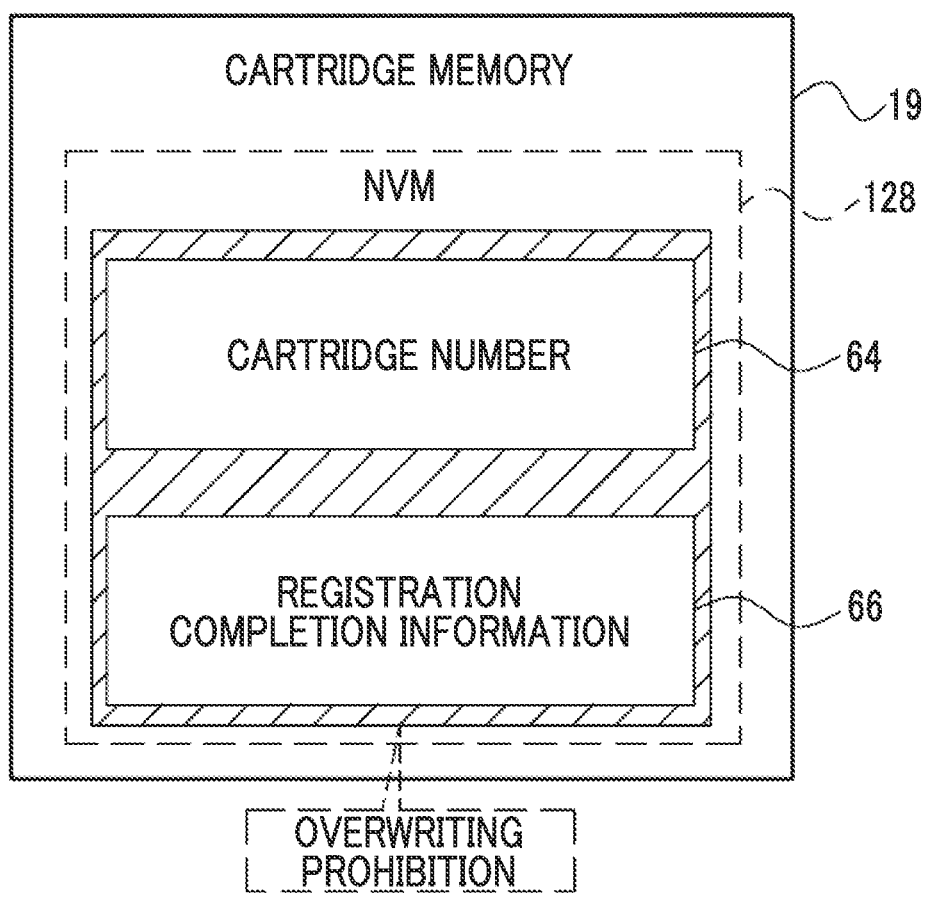
FIG. 16 is a diagram showing an example where a storage region of information stored in the cartridge memory is set to overwriting prohibition.

As shown in FIG. 16 as an example, storage regions of the cartridge number 64 and the registration completion information 66 in the NVM 128 are set to overwriting prohibition by the overwriting prohibition processing 72. The user cannot perform overwriting of the cartridge number 64 and the registration completion information 66 stored in the NVM 128 of the cartridge 20 by the overwriting prohibition processing 72.

In the overwriting prohibition request signal, a storage region designated as a target for overwriting prohibition by the overwriting prohibition request signal is set to overwriting prohibition. Accordingly, in regard to data that is stored in a storage region in the NVM 128 not set to overwriting prohibition, readout, deletion, and change of data by the library controller 14 are permitted.

Figure 17:
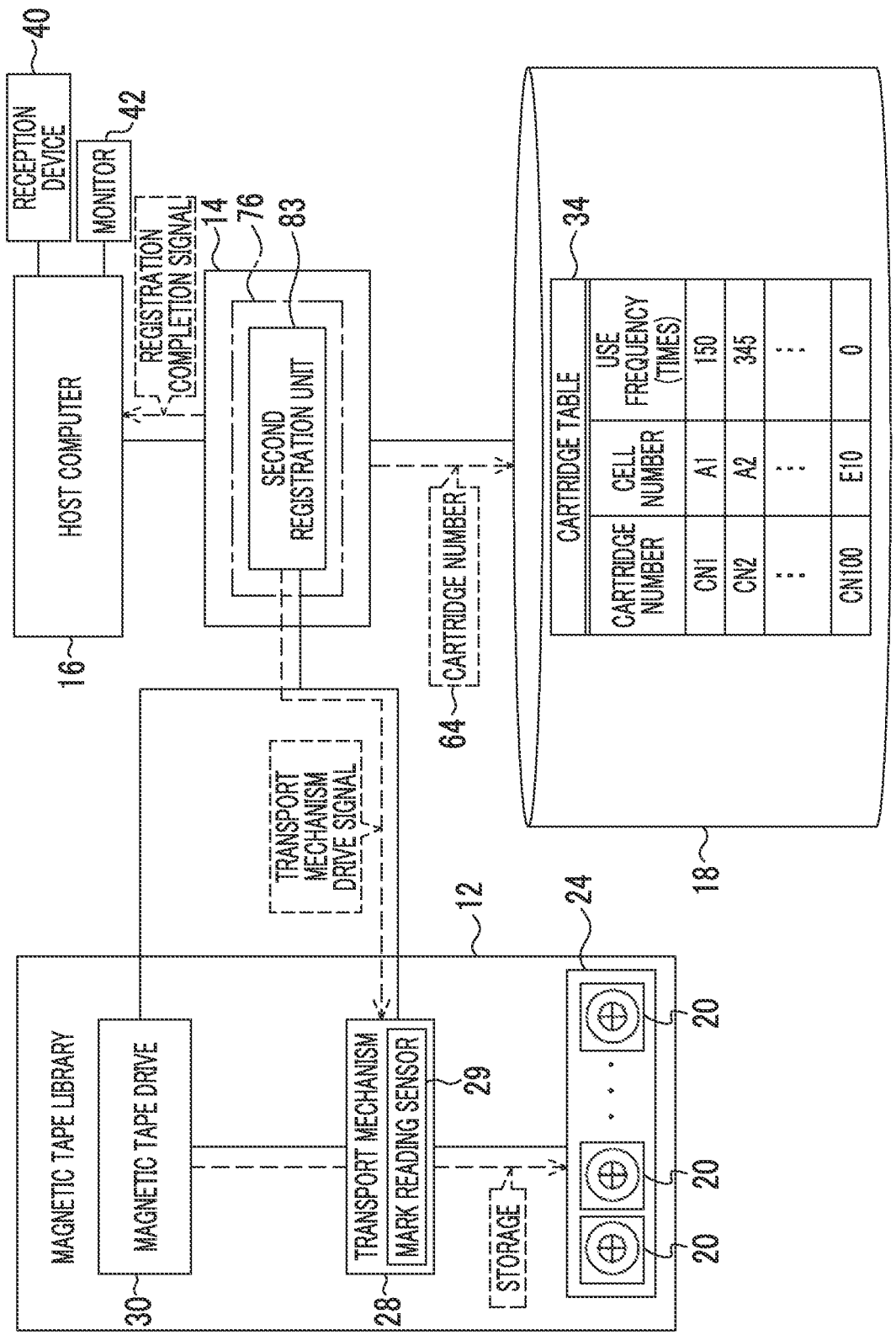
FIG. 17 is a block diagram showing an example of second registration processing by a second registration unit.

After the overwriting prohibition processing 72 ends, as shown in FIG. 17 as an example, the second registration unit 83 executes the second registration processing 73.

The second registration unit 83 writes the cartridge number 64 received from the mark reading sensor 29 in the registration preparation processing 70, that is, the cartridge number 64 allocated to the unregistered cartridge 20 to the cartridge table 34. Specifically, the second registration unit 83 writes the cartridge number 64 to the cartridge table 34 in association with the cell number of the cartridge storage cell 24 where the unregistered cartridge 20 has been stored.

Figure 18:
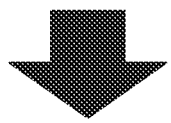
FIG. 18 is a diagram showing a registration example of a cartridge table by the second registration processing.

As shown in FIG. 18 as an example, in a case where the cell number is "E10", and the cartridge number 64 is "CN100", "CN100" and "E10" are written to the cartridge table 34 in association with each other.

The second registration unit 83 may write the cartridge number 64 to the cartridge table 34 only in a case where the registration completion information 66 is not stored in the NVM 128 of the unregistered cartridge 20 in the first registration processing 71.

In a case where writing of the cartridge number 64 to the cartridge table 34 ends, the second registration unit 83 makes the transport mechanism 28 perform the storage operation by outputting the transport mechanism driving signal to the transport mechanism 28. Specifically, the second registration unit 83 outputs the transport mechanism driving signal designated to store the cartridge 20 loaded into the magnetic tape drive 30 in the cartridge storage cell 24 of the cell number "E10" included in the registration request signal received from the host computer 16 in the registration preparation processing 70, to the transport mechanism 28. With this, the cartridge 20 loaded into the magnetic tape drive 30 is taken out from the magnetic tape drive 30 and is stored in the original cartridge storage cell 24.

After the transport mechanism driving signal is output to the transport mechanism 28, the second registration unit 83 outputs a registration completion signal representing that the registration processing requested by the registration request signal is completed, to the host computer 16. The second registration unit 83 may output the registration completion signal to the host computer 16 in a period from the end of writing of the cartridge table 34 to the cartridge number 64 until the output of the transport mechanism driving signal to the transport mechanism 28.

The host computer 16 that receives the registration completion signal notifies the manager that the registration of the cartridge 20 in the cartridge management system 10 is completed, for example, by displaying a completion screen (not shown) on the monitor 42. With the above, the registration processing of the cartridge 20 shown in FIG. 9 ends.

The first registration unit 81 may store the cartridge number 64 in the NVM 128 in plain text, but may encrypt the cartridge number 64 and may store the encrypted cartridge number 64 in the NVM 128 such that information regarding the cartridge 20 does not leak. In the encryption of the cartridge number 64, for example, a known encryption method, such as AES, is used.

A timing of encrypting the cartridge number 64 is not necessarily a timing before the storage in the NVM 128. For example, after the first registration unit 81 stores the cartridge number 64 in the NVM 128 in plain text, the overwriting prohibition setting unit 82 may encrypt the cartridge number 64 stored in the NVM 128.

Next, the access processing shown in FIG. 10 will be described.

Figure 19:
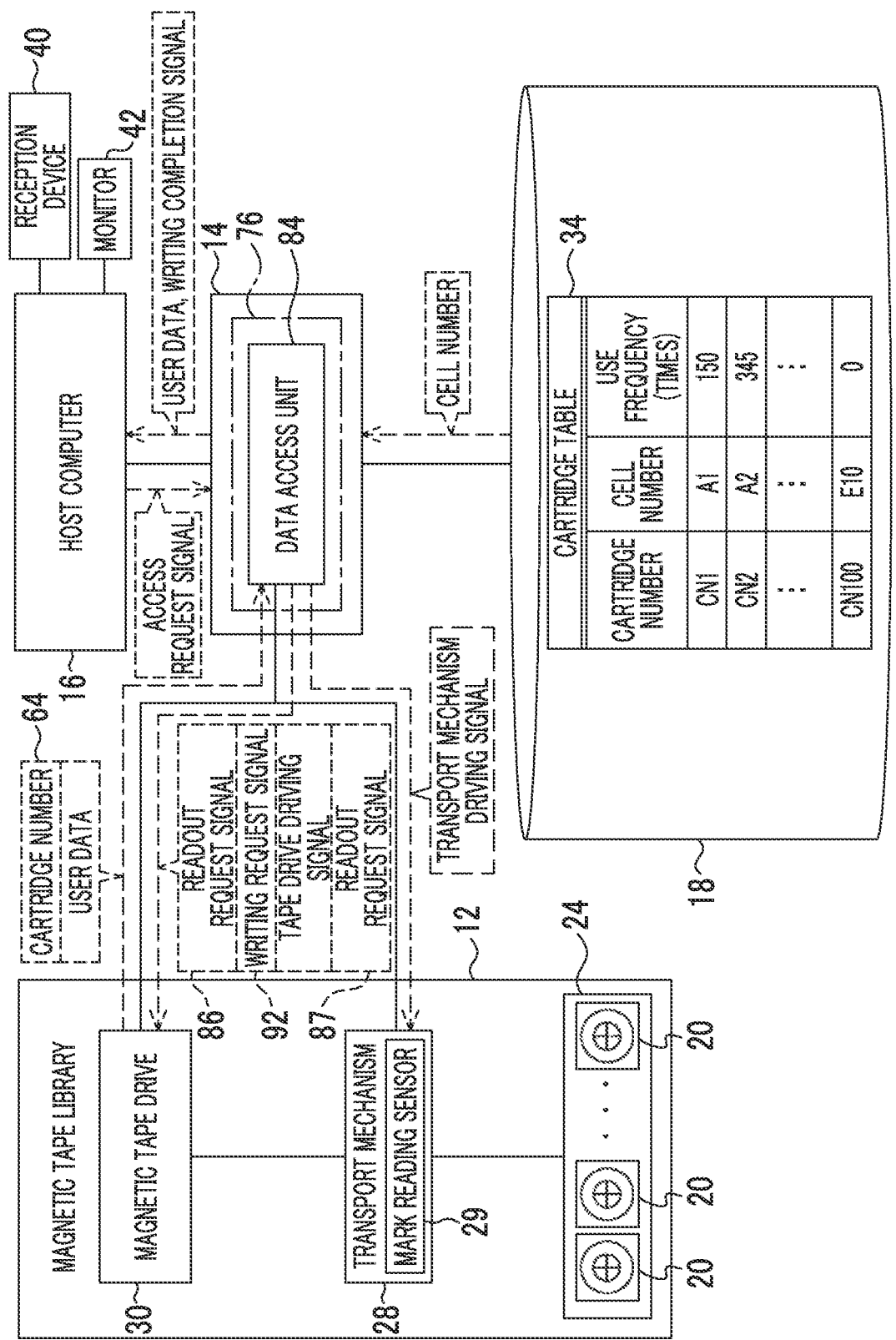
FIG. 19 is a block diagram showing an example of access processing by a data access unit.

As shown in FIG. 19 as an example, the data access unit 84 executes the access processing in response to an access request signal input from the host computer 16. The access request signal is output from the host computer 16 in response to a user instruction received by the reception device 40. The user instruction indicates an instruction from the user. The user instruction includes the cartridge number 64 capable of specifying the cartridge 20 designated as a target for reading and writing of the user data by the user. The host computer 16 generates the access request signal including the cartridge number 64 of the cartridge 20 to be a target for the access processing and outputs the generated access request signal to the data access unit 84. The access request signal is an example of a request signal that is output from the host computer 16 to the library controller 14.

The access request signal includes an access type for designating readout of the user data from the cartridge 20 and/or writing of the user data to the cartridge 20. In a case where the access type is "readout", the data access unit 84 performs readout of the user data from the magnetic tape MT of the cartridge 20. In a case where the access type is "writing", the data access unit 84 performs writing of the user data to the magnetic tape MT of the cartridge 20. The access request signal in which the access type is set to "writing" also includes the user data that is written to the magnetic tape MT of the designated cartridge 20.

In a case where the cartridge number 64 of the cartridge 20 to be a target for reading and writing of the user data is acquired, the data access unit 84 reads out the cell number associated with the acquired cartridge number 64 from the cartridge table 34.

In a case where the acquired cartridge number 64 is stored in the cartridge table 34, the cell number associated with the acquired cartridge number 64 is read out from the cartridge table 34.

On the other hand, in a case where the acquired cartridge number 64 is not stored in the cartridge table 34, the cell number associated with the acquired cartridge number 64 is not read out from the cartridge table 34.

Accordingly, it is understood whether or not the cartridge number 64 is stored in the storage 18 depending on a readout situation of the cell number from the cartridge table 34.

Among the cartridge numbers 64 for which the cell number is to be read out, the cartridge number 64 for which the cell number is read out from the storage 18 by the data access unit 84 is an example of "identification information stored in a first storage medium" according to the technique of the present disclosure.

The cell number read out from the storage 18 by the data access unit 84 is the cell number of the cartridge storage cell 24 where the cartridge 20 as a target for reading and writing of the user data is stored. In a case where the cell number is read out from the storage 18, the data access unit 84 outputs the transport mechanism driving signal read out from the storage 18 to the transport mechanism 28. The transport mechanism 28 performs the loading operation to take out the cartridge 20 as a target for reading and writing of the user data from the cartridge storage cell 24 of the magnetic tape library 12 designated by the cell number included in the transport mechanism driving signal and to load the cartridge 20 into the magnetic tape drive 30.

In a case where the unregistered cartridge 20 that is registered in the cartridge management system 10 through the registration processing shown in FIG. 9 is a new cartridge 20, the same cartridge number 64 is stored in the NVM 128 and the cartridge table 34.

On the other hand, in a case where the unregistered cartridge 20 that is registered in the cartridge management system 10 through the registration processing shown in FIG. 9 is a used cartridge 20, since the registration completion information 66 is already stored for the used cartridge 20, the cartridge number 64 allocated by the manager is not stored in the NVM 128.

The new cartridge 20 refers to the cartridge 20 for which the cartridge number 64 and the registration completion information 66 are not stored in the NVM 128. The used cartridge 20 refers to the cartridge 20 for which the cartridge number 64 and the registration completion information 66 are already stored in the NVM 128 before the registration processing shown in FIG. 9 is executed in the cartridge management system 10. That is, the used cartridge 20 refers to the cartridge 20 on which the registration processing is executed in the cartridge management system 10 separate from the cartridge management system 10 managed by the manager.

The library controller 14 performs control such that the access processing is not executed on the used cartridge 20. The cartridge number 64 is allocated to the cartridge 20 for each cartridge management system 10. That is, the cartridge number 64 that is different from the cartridge number 64 allocated by the manager is stored in the NVM 128 of the used cartridge 20 on which the registration processing is executed in the separate cartridge management system 10.

Accordingly, to determine whether or not the cartridge 20 as a target for reading and writing of the user data is the used cartridge 20, the data access unit 84 outputs a readout request signal 86 in which the cartridge number 64 stored in the NVM 128 is a target for readout, to the magnetic tape drive 30.

In a case where the readout request signal 86 is input, the magnetic tape drive 30 reads out the cartridge number 64 from the NVM 128 of the cartridge 20 loaded into the magnetic tape drive 30. The magnetic tape drive 30 outputs the cartridge number 64 read out from the NVM 128 to the data access unit 84.

The data access unit 84 compares the cartridge number 64 stored in the NVM 128 with the cartridge number 64 designated by the access request signal, that is, the cartridge number 64 stored in the storage 18.

In a case where the cartridge number 64 stored in the NVM 128 coincides with the cartridge number 64 designated by the access request signal, the cartridge 20 loaded in the magnetic tape drive 30 is not a used cartridge 20. Accordingly, in a case where the cartridge number 64 stored in the NVM 128 coincides with the cartridge number 64 designated by the access request signal, the data access unit 84 continues the access processing on the cartridge 20.

In a case where the access type specified from the access request signal is "readout", the data access unit 84 outputs the tape drive driving signal and a readout request signal 87 in which the user data stored in the magnetic tape MT is a target for readout, to the magnetic tape drive 30. The magnetic tape drive 30 makes the magnetic tape MT run in response to the tape drive driving signal input from the data access unit 84 and reads out the user data from the magnetic tape MT. The user data read out from the magnetic tape MT is output to the host computer 16.

On the other hand, in a case where the access type specified from the access request signal is "writing", the data access unit 84 outputs a writing request signal 92 of the user data to the magnetic tape MT and the tape drive driving signal to the magnetic tape drive 30. The magnetic tape drive 30 makes the magnetic tape MT run in response to the tape drive driving signal input from the data access unit 84 and writes the user data to the magnetic tape MT.

In a case where writing of the user data to the magnetic tape MT is completed, the data access unit 84 outputs a writing completion signal representing that writing of the user data to the magnetic tape MT of the cartridge 20 designated by the access request signal is completed, to the host computer 16. The host computer 16 that receives the writing completion signal notifies the user that writing of the user data to the cartridge 20 is completed, for example, by displaying a completion screen (not shown) on the monitor 42. With the above, the access processing to the cartridge 20 shown in FIG. 10 ends.

In a case where the access type specified from the access request signal is "readout and writing", the data access unit 84 outputs the tape drive driving signal, the readout request signal 87 in which the user data stored in the magnetic tape MT is a target for readout, and the writing request signal 92 of the user data to the magnetic tape MT, to the magnetic tape drive 30. The magnetic tape drive 30 makes the magnetic tape MT run in response to the tape drive driving signal input from the data access unit 84, reads out the user data from the magnetic tape MT, and writes the user data to the magnetic tape MT. That is, the data access unit 84 performs readout of the user data from the magnetic tape MT and writing of the user data to the magnetic tape MT with one access request signal.

The operations of the cartridge management system 10 according to the embodiment will be described referring to FIGS. 20 to 25.

Figure 20:
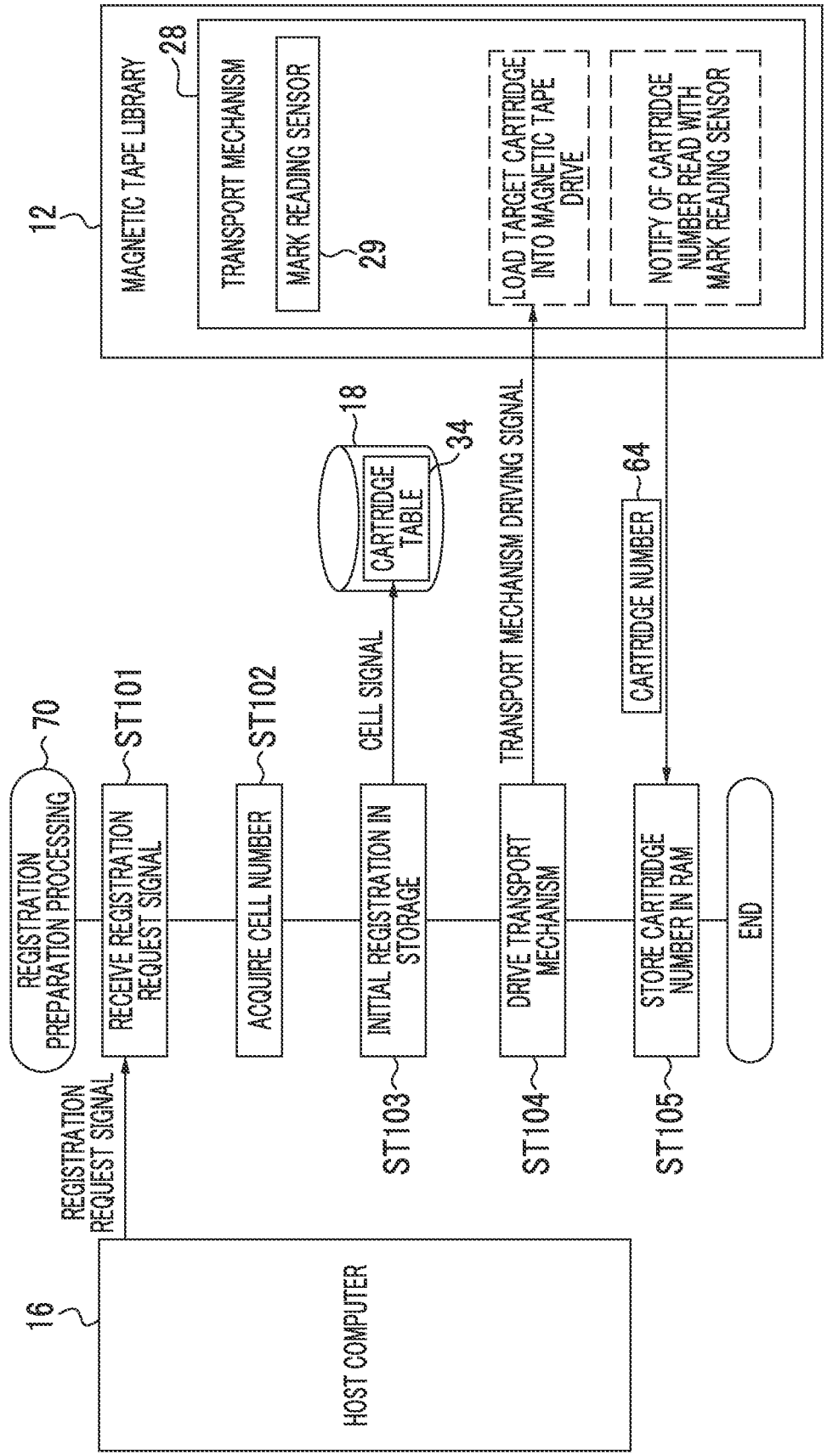
FIG. 20 is a flowchart illustrating an example of a flow of the registration preparation processing.

FIG. 20 as an example shows an example of a flow of the registration preparation processing 70 that is executed in the CPU 76 of the library controller 14 in a case where the registration request signal is received from the host computer 16.

In the registration preparation processing 70 shown in FIG. 20, first, in Step ST101, the registration preparation unit 80 receives the registration request signal from the host computer 16. Thereafter, the registration preparation processing 70 progresses to Step ST102.

In Step ST102, the registration preparation unit 80 acquires the cell number of the cartridge storage cell 24 where the cartridge 20 as a registration target is stored, from the registration request signal. Thereafter, the registration preparation processing 70 progresses to Step ST103.

To perform initial registration of the cell number acquired in ST102, in Step ST103, the registration preparation unit 80 stores the cell number acquired in ST102 in the cartridge table 34 in the storage 18. Thereafter, the registration preparation processing 70 progresses to Step ST104.

In Step ST104, the registration preparation unit 80 outputs the transport mechanism driving signal to the transport mechanism 28 and loads the cartridge 20 stored in the cartridge storage cell 24 of the cell number acquired in ST102 into the magnetic tape drive 30. During loading of the designated cartridge 20 into the magnetic tape drive 30, the cartridge number 64 of the designated cartridge 20 is read by the mark reading sensor 29 of the transport mechanism 28. Thereafter, the registration preparation processing 70 progresses to Step ST105.

In Step ST105, the registration preparation unit 80 acquires the cartridge number 64 of the cartridge 20 loaded into the magnetic tape drive 30 from the mark reading sensor 29 and stores the cartridge number 64 in the RAM 79. With this, the registration preparation unit 80 ends the registration preparation processing 70.

Figure 21:
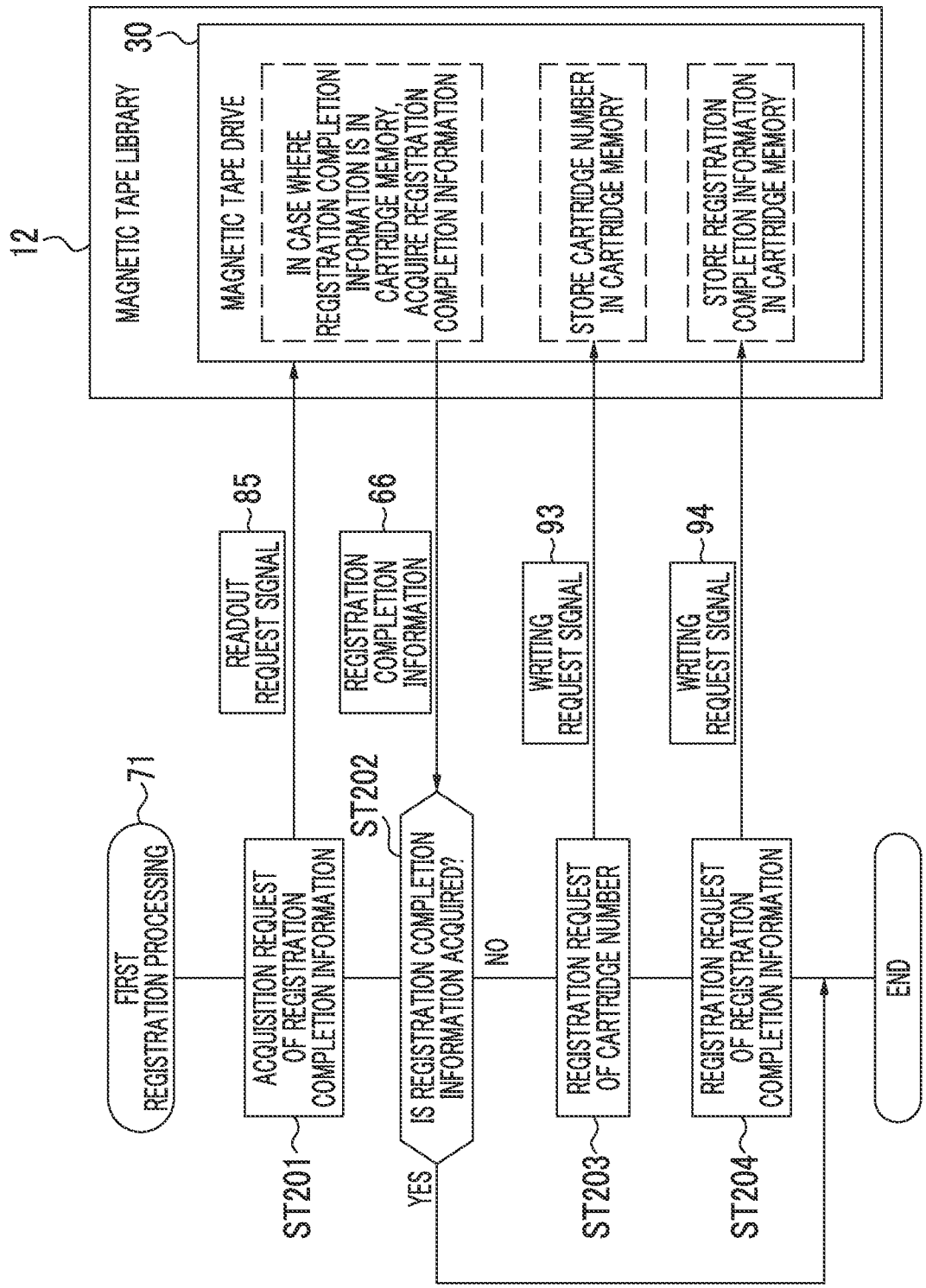
FIG. 21 is a flowchart illustrating an example of a flow of the first registration processing.

FIG. 21 as an example shows an example of a flow of the first registration processing 71 that is executed in the CPU 76 of the library controller 14 after the end of the registration preparation processing 70.

In the first registration processing 71 shown in FIG. 21, first, in Step ST201, the first registration unit 81 outputs the readout request signal 85 in which the registration completion information 66 is a target for readout, to the magnetic tape drive 30 into which the cartridge 20 is loaded. For convenience of description, in the following description, the magnetic tape drive 30 that is an output destination of various request signals, that is, the magnetic tape drive 30 into which the cartridge 20 is loaded is simply referred to as the "magnetic tape drive 30". Thereafter, the first registration processing 71 progresses to Step ST202.

In a case where the registration completion information 66 is stored in the NVM 128 of the loaded cartridge 20, the magnetic tape drive 30 that receives the readout request signal 85 outputs the registration completion information 66 read out from the NVM 128, to the first registration unit 81.

In Step ST202, the first registration unit 81 determines whether or not the registration completion information 66 is acquired from the magnetic tape drive 30. In Step ST202, in a case where the first registration unit 81 acquires the registration completion information 66, determination is affirmative, and the first registration unit 81 ends the first registration processing 71. In Step ST202, in a case where the first registration unit 81 cannot acquire the registration completion information 66, determination is negative, and the first registration processing 71 progresses to Step ST203.

In Step ST203, the first registration unit 81 outputs the writing request signal 93 for requesting to write the cartridge number 64 stored in the RAM 79 in Step ST105 of the registration preparation processing 70 shown in FIG. 20 to the NVM 128, to the magnetic tape drive 30. Thereafter, the first registration processing 71 progresses to Step ST204. The magnetic tape drive 30 that receives the writing request signal 93 stores the cartridge number 64 designated by the writing request signal 93 in the NVM 128 of the loaded cartridge 20.

In Step ST204, the first registration unit 81 outputs the writing request signal 94 for requesting to write the registration completion information 66 to the NVM 128, to the magnetic tape drive 30. The magnetic tape drive 30 that receives the writing request signal 94 stores the registration completion information 66 designated by the writing request signal 94 in the NVM 128 of the loaded cartridge 20. With this, the first registration unit 81 ends the first registration processing 71.

Figure 22:
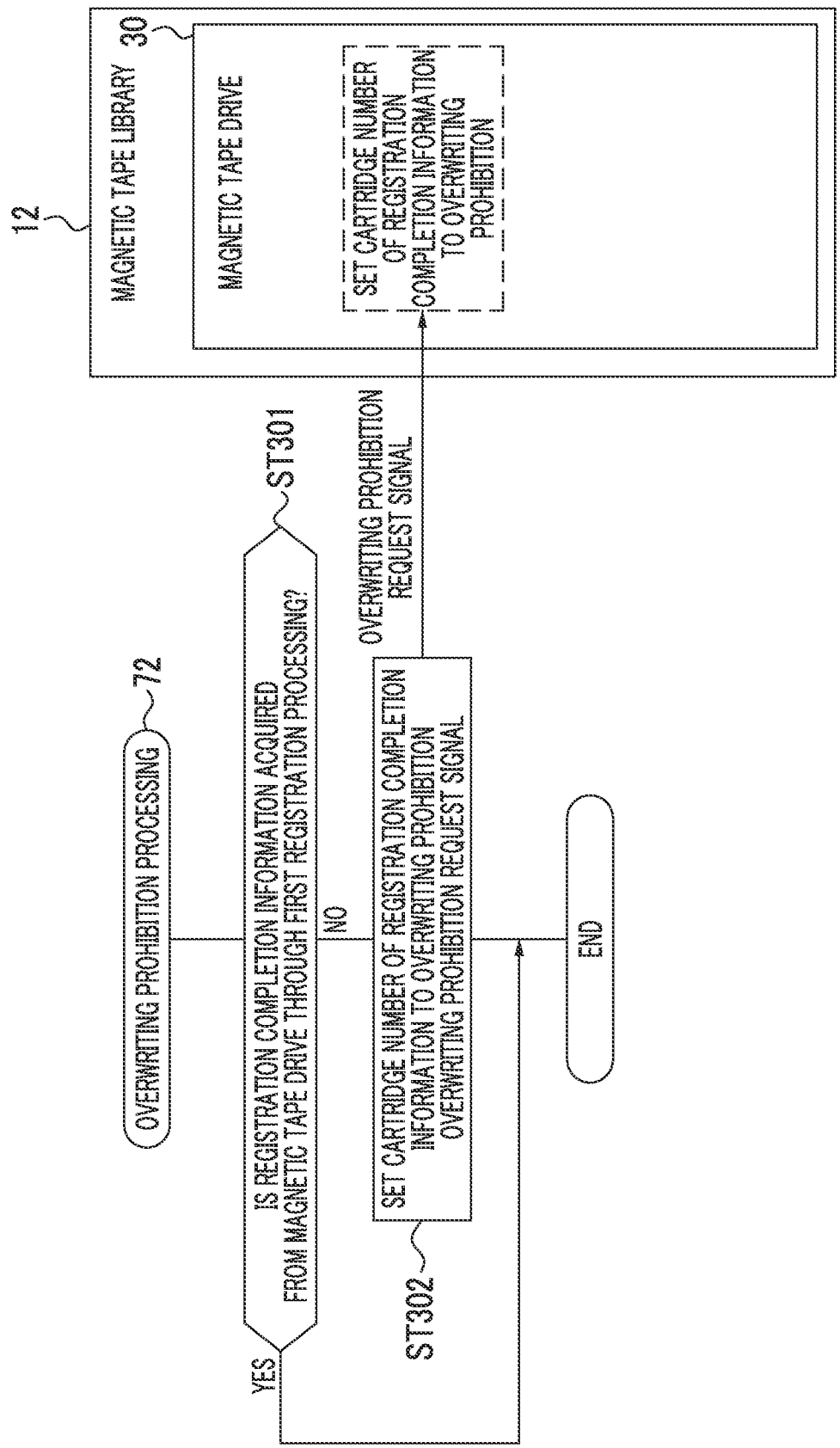
FIG. 22 is a flowchart illustrating an example of a flow of the overwriting prohibition processing.

FIG. 22 as an example shows an example of a flow of the overwriting prohibition processing 72 that is executed in the CPU 76 of the library controller 14 after the end of the first registration processing 71.

In the overwriting prohibition processing 72 shown in FIG. 22, first, in Step ST301, the overwriting prohibition setting unit 82 determines whether or not the registration completion information 66 is acquired from the magnetic tape drive 30 in the first registration processing 71 shown in FIG. 21. In Step ST301, in a case where the first registration unit 81 does not acquire the registration completion information 66, determination is negative, and the overwriting prohibition processing 72 progresses to Step ST302.

In Step ST302, the overwriting prohibition setting unit 82 outputs the overwriting prohibition request signal for setting the cartridge number 64 and the registration completion information 66 stored in the NVM 128 to overwriting prohibition, to the magnetic tape drive 30. With this, the overwriting prohibition setting unit 82 ends the overwriting prohibition processing 72. The magnetic tape drive 30 that receives the overwriting prohibition request signal sets the storage regions of the cartridge number 64 and the registration completion information 66 in the NVM 128 to overwriting prohibition.

On the other hand, in Step ST301, in a case where the first registration unit 81 acquires the registration completion information 66, determination is affirmative, and the overwriting prohibition setting unit 82 ends the overwriting prohibition processing 72.

Figure 23:
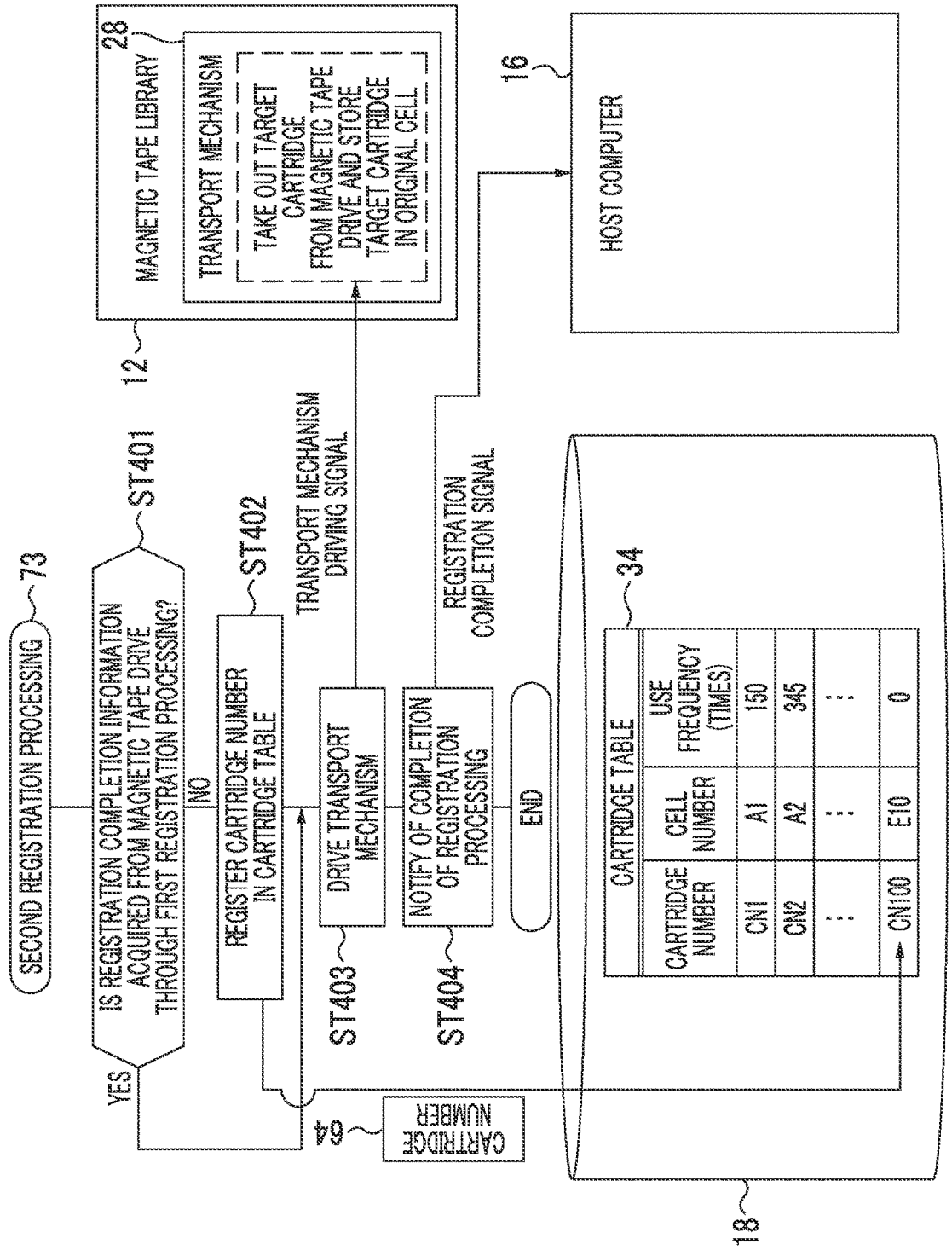
FIG. 23 is a flowchart illustrating an example of a flow of the second registration processing.

FIG. 23 as an example shows an example of a flow of the second registration processing 73 that is executed in the CPU 76 of the library controller 14 after the end of the overwriting prohibition processing 72.

In the second registration processing 73 shown in FIG. 23, first, in Step ST401, the second registration unit 83 determines whether or not the registration completion information 66 is acquired from the magnetic tape drive 30 in the first registration processing 71 shown in FIG. 21. In Step ST401, in a case where the first registration unit 81 does not acquire the registration completion information 66, determination is negative, and the second registration processing 73 progresses to Step ST402.

In Step ST402, the second registration unit 83 writes the cartridge number 64 of the cartridge 20 as a registration target acquired from the mark reading sensor 29 in the registration preparation processing 70 shown in FIG. 20 to the cartridge table 34 in association with the cell number acquired in Step ST102 of the registration preparation processing 70 shown in FIG. 20. Thereafter, the second registration processing 73 progresses to Step ST403.

On the other hand, in Step ST401, in a case where the first registration unit 81 acquires the registration completion information 66, determination is affirmative, and the second registration processing 73 progresses to Step ST403.

In Step ST403, the second registration unit 83 outputs the transport mechanism driving signal to the transport mechanism 28 and makes the transport mechanism 28 take out the cartridge 20 from the magnetic tape drive 30 and load the cartridge 20 into the original cartridge storage cell 24 where the cartridge 20 has been stored. Thereafter, the second registration processing 73 progresses to Step ST404.

In Step ST404, the second registration unit 83 outputs the registration completion signal to the host computer 16 to end the second registration processing 73.

With the above, the registration processing of the cartridge 20 in the cartridge management system 10 ends.

Figure 24:
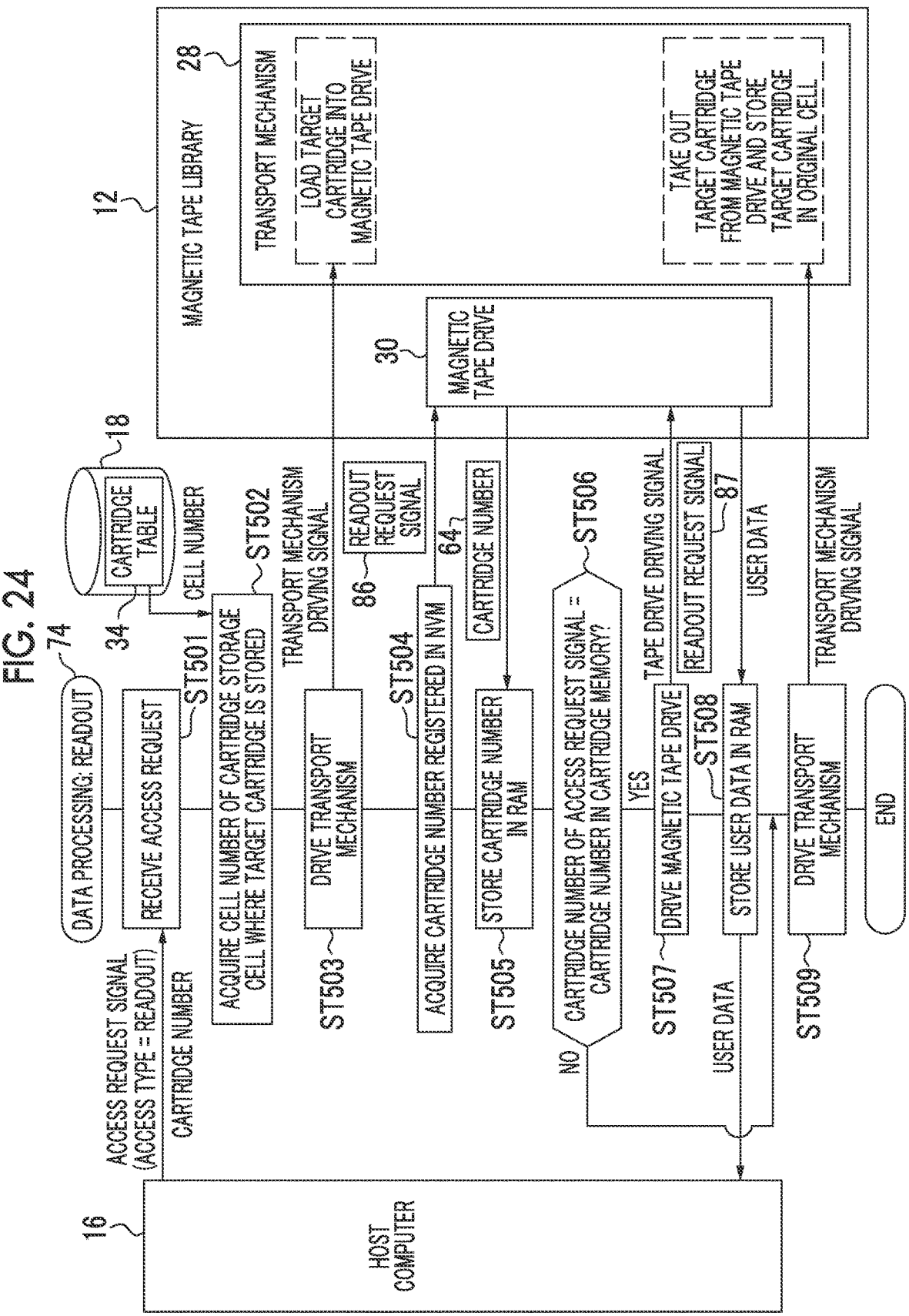
FIG. 24 is a flowchart illustrating an example of a flow of data processing of reading out user data.

FIG. 24 as an example shows an example of a flow of the data processing 74 that is executed in the CPU 76 of the library controller 14 in a case where the access request signal in which the access type is set to "readout" is received from the host computer 16.

In the data processing 74 shown in FIG. 24, first, in Step ST501, the data access unit 84 receives the access request signal from the host computer 16. Thereafter, the data processing 74 progresses to Step ST502.

In Step ST502, the data access unit 84 acquires the cartridge number 64 of the cartridge 20 to be a target for readout of the user data from the access request signal. To acquire the cell number of the cartridge storage cell 24 where the cartridge 20 to be a target for readout of the user data is stored, the data access unit 84 reads out the cell number associated with the acquired cartridge number 64 from the cartridge table 34. Thereafter, the data processing 74 progresses to Step ST503.

In Step ST503, the data access unit 84 outputs the transport mechanism driving signal to the transport mechanism 28 and makes the transport mechanism 28 load the cartridge 20 stored in the cartridge storage cell 24 of the cell number acquired in ST502 into the magnetic tape drive 30. Thereafter, the data processing 74 progresses to Step ST504.

In Step ST504, the data access unit 84 outputs the readout request signal 86 in which the cartridge number 64 stored in the NVM 128 of the cartridge 20 loaded into the magnetic tape drive 30 is a target for readout, to the magnetic tape drive 30. Thereafter, the data processing 74 progresses to Step ST505.

In Step ST505, the data access unit 84 stores the cartridge number 64 output from the magnetic tape drive 30 in the RAM 79 in response to the readout request signal 86 output in Step ST504. Thereafter, the data processing 74 progresses to Step ST506.

In Step ST506, the data access unit 84 determines whether or not the cartridge number 64 included in the access request signal acquired in Step ST501 coincides with and the cartridge number 64 acquired in Step ST505, that is, the cartridge number 64 stored in the NVM 128 of the cartridge 20 to be a target for readout of the user data.

In Step ST506, in a case where the cartridge number 64 included in the access request signal coincides with the cartridge number 64 stored in the NVM 128, determination is affirmative, and the data processing 74 progresses to Step ST507.

In Step ST507, the data access unit 84 outputs the tape drive driving signal and the readout request signal 87 in which the user data stored in the magnetic tape MT is a target for readout, to the magnetic tape drive 30 to the drive of the magnetic tape drive 30. Thereafter, the data processing 74 progresses to Step ST508.

In Step ST508, the data access unit 84 stores the user data output from the magnetic tape drive 30 in the RAM 79 in response to the readout request signal 87 output in Step ST507. The data access unit 84 outputs the user data stored in the RAM 79 to the host computer 16. Through Step ST508, the user data read out from the cartridge 20 instructed by the user is output to the host computer 16. Thereafter, the data processing 74 progresses to Step ST509.

On the other hand, in Step ST506, in a case where the cartridge number 64 included in the access request signal does not coincide with the cartridge number 64 stored in the NVM 128, determination is negative, and the data processing 74 progresses to Step ST509 without executing Steps ST507 and ST508. That is, in a case where the cartridge number 64 included in the access request signal does not coincide with the cartridge number 64 stored in the NVM 128, the data access unit 84 does not perform readout of the user data from the magnetic tape MT of the cartridge 20.

In Step ST509, the data access unit 84 outputs the transport mechanism driving signal to the transport mechanism 28 and makes the transport mechanism 28 take out the cartridge 20 from the magnetic tape drive 30 and store the cartridge 20 in the original cartridge storage cell 24 where the cartridge 20 has been stored. With this, the data access unit 84 ends the data processing 74.

Figure 25:
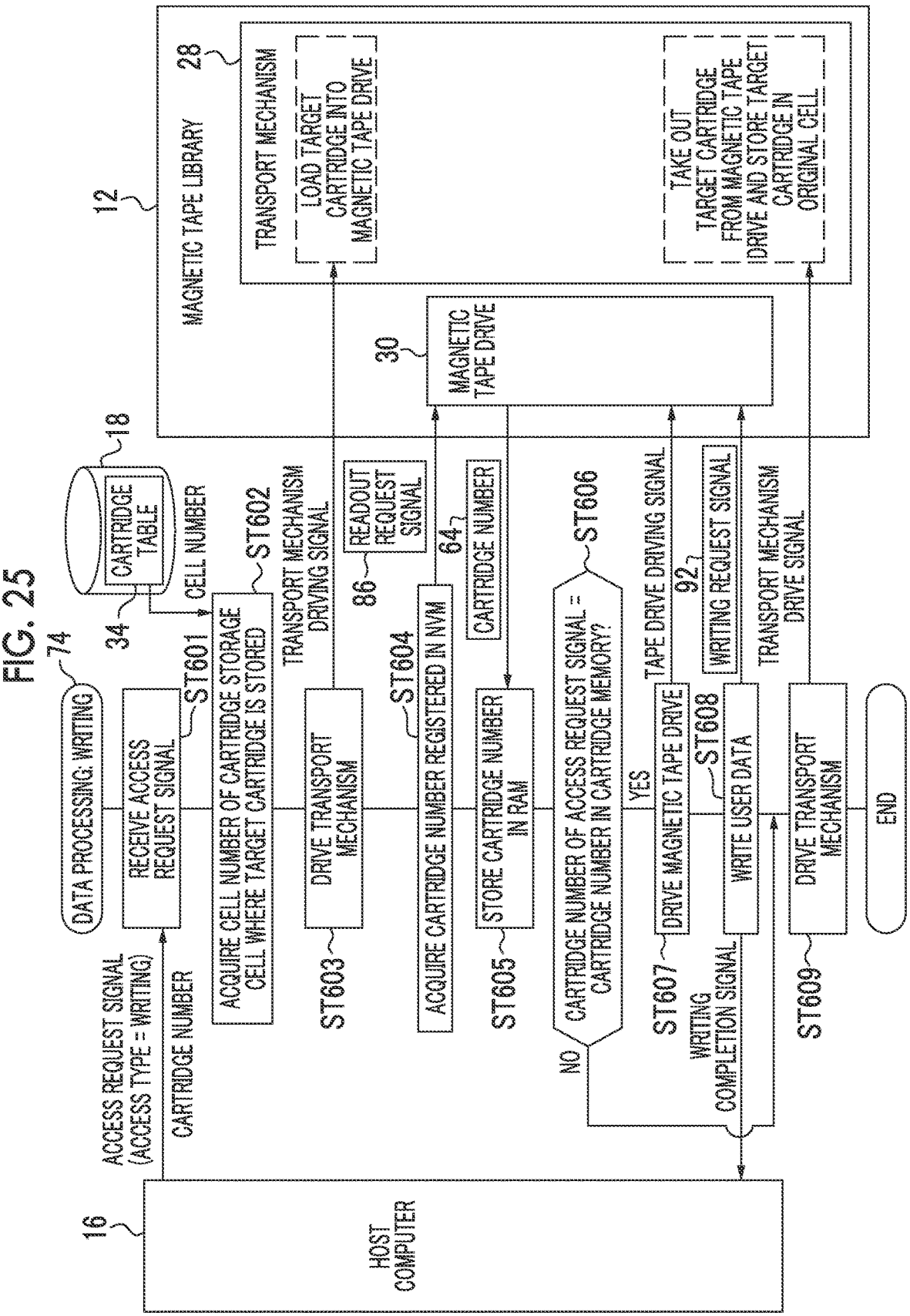
FIG. 25 is a flowchart illustrating an example of a flow of data processing of writing the user data.

FIG. 25 as an example shows an example of a flow of the data processing 74 that is executed in the CPU 76 of the library controller 14 in a case where the access request signal in which the access type is set to "writing" is received from the host computer 16.

In the data processing 74 shown in FIG. 25, first, in Step ST601, the data access unit 84 receives the access request signal from the host computer 16. Thereafter, the data processing 74 progresses to Step ST602.

In Step ST602, the data access unit 84 acquires the cartridge number 64 of the cartridge 20 to be a target for writing of the user data from the access request signal. The data access unit 84 reads out the cell number associated with the acquired cartridge number 64 from the cartridge table 34. Thereafter, the data processing 74 progresses to Step ST603.

In Step ST603, the data access unit 84 outputs the transport mechanism driving signal to the transport mechanism 28 and makes the transport mechanism 28 load the cartridge 20 stored in the cartridge storage cell 24 of the cell number acquired in ST602 into the magnetic tape drive 30. Thereafter, the data processing 74 progresses to Step ST604.

In Step ST604, the data access unit 84 outputs the readout request signal 86 in which the cartridge number 64 stored in the NVM 128 of the cartridge 20 loaded into the magnetic tape drive 30 is a target for readout, to the magnetic tape drive 30. Thereafter, the data processing 74 progresses to Step ST605.

In Step ST605, the data access unit 84 stores the cartridge number 64 output from the magnetic tape drive 30 in the RAM 79 in response to the readout request signal 86 output in Step ST604. Thereafter, the data processing 74 progresses to Step ST606.

In Step ST606, the data access unit 84 determines whether or not the cartridge number 64 included in the access request signal acquired in Step ST601 coincides with the cartridge number 64 acquired in Step ST605, that is, the cartridge number 64 stored in the NVM 128 of the cartridge 20 to be a target for writing of the user data.

In Step ST606, in a case where the cartridge number 64 included in the access request signal coincides with the cartridge number 64 stored in the NVM 128, determination is affirmative, and the data processing 74 progresses to Step ST607.

In Step ST607, the data access unit 84 outputs the tape drive driving signal to the magnetic tape drive 30 to start the drive of the magnetic tape drive 30. Thereafter, the data processing 74 progresses to Step ST608.

In Step ST608, the data access unit 84 outputs the writing request signal 92 to the magnetic tape drive 30 to write the user data included in the access request signal received in Step ST601 to the magnetic tape MT of the cartridge 20. Through Step ST608, the user data designated by the user is written to the magnetic tape MT of the cartridge 20 instructed by the user. With writing of the user data to the magnetic tape MT, the data access unit 84 outputs the writing completion signal to the host computer 16. Thereafter, the data processing 74 progresses to Step ST609.

On the other hand, in Step ST606, in a case where the cartridge number 64 included in the access request signal does not coincide with the cartridge number 64 stored in the NVM 128, determination is negative, and the data processing 74 progresses to Step ST609 without executing Steps ST607 and ST608. That is, in a case where the cartridge number 64 included in the access request signal does not coincide with the cartridge number 64 stored in the NVM 128, the data access unit 84 does not perform writing of the user data to the magnetic tape MT of the cartridge 20.

In Step ST609, the data access unit 84 outputs the transport mechanism driving signal to the transport mechanism 28 and makes the transport mechanism 28 take out the cartridge 20 from the magnetic tape drive 30 and store the cartridge 20 in the original cartridge storage cell 24 where the cartridge 20 has been stored. With this, the data access unit 84 ends the data processing 74.

In the above-described embodiment, an example where the manager allocates the cartridge number 64 to the cartridge 20 before executing the registration processing of the cartridge 20 in the cartridge management system 10 has been described. Note that, instead of the manager of each cartridge management system 10 allocating the cartridge number 64 to the cartridge 20, the manufacturer of the cartridge 20 may allocate the cartridge number 64 to each cartridge 20 before shipment of the cartridge 20.

Figure 26:
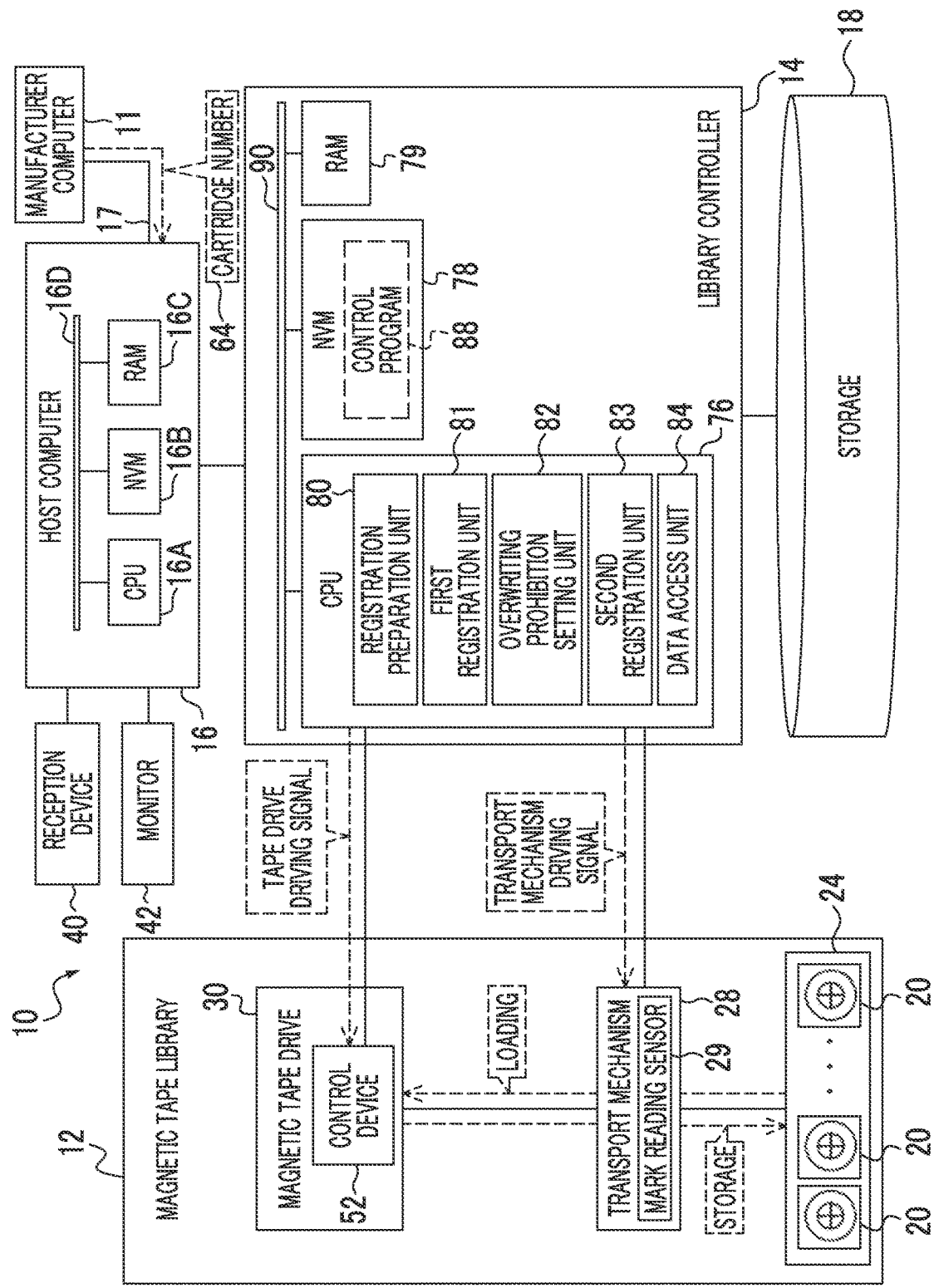
FIG. 26 is a diagram showing a hardware configuration example where a host computer of the cartridge management system and a manufacturer computer installed in a manufacturer of the cartridge are connected through a communication line.

As shown in FIG. 26 as an example, a manufacturer computer 11 is installed in a manufacturer of the cartridge 20, and the manufacturer computer 11 is connected to the host computer 16 of each cartridge management system 10 with a communication line 17. The communication line 17 may be any of a wired line or a wireless line. The communication line 17 may be any of a dedicated line or a public line.

For example, in a case where the manager purchases a new cartridge 20 from the manufacturer of the cartridge 20, the cartridge numbers 64 depending on the number of purchased cartridges 20 are notified from the manufacturer computer 11 to the host computer 16 through the communication line 17. A notification method of the cartridge number 64 through the communication line 17 includes, for example, notification using a home page, mail, and SNS.

The manager gives the mark 21 representing the cartridge number 64 issued by the manufacturer of the cartridge 20 to the case 36 of the new cartridge 20 to execute the registration processing and the access processing.

An issuance timing of the cartridge number 64 is not limited, and the manufacturer of the cartridge 20 may notify the host computer 16 of the cartridge management system 10 of the cartridge number 64 at the time of shipment of the cartridge 20. The manufacturer of the cartridge 20 may notify of the cartridge number 64 in a case where there is an issuance request of the cartridge number 64 from the host computer 16 of the cartridge management system 10 as a shipment destination of the cartridge 20 to the manufacturer computer 11.

The manufacturer of the cartridge 20 may notify the manager of the cartridge number 64 by mail, call, and FAX.

The manufacturer of the cartridge 20 may store the cartridge number 64 and the registration completion information 66 set to overwriting prohibition in the NVM 128 using the magnetic tape drive 30 in a factory at any timing of a stage where the cartridge 20 is manufactured, a stage where the cartridge 20 is inspected, or a stage where the cartridge 20 is shipped. In a case where the manufacturer of the cartridge 20 stores the cartridge number 64 and the registration completion information 66 in the NVM 128, in the cartridge management system 10, it should suffice that, in the registration processing of the cartridge 20, the cartridge number 64 is stored in the cartridge table 34 in association with the cell number of the cartridge storage cell 24 where the cartridge 20 is stored. Accordingly, the mark 21 of the cartridge 20 is not necessarily given. In a case where the mark 21 is not given to the cartridge 20, the cartridge number 64 that is stored in the cartridge table 34 may be input to the host computer 16 by the manager.

Figure 27:
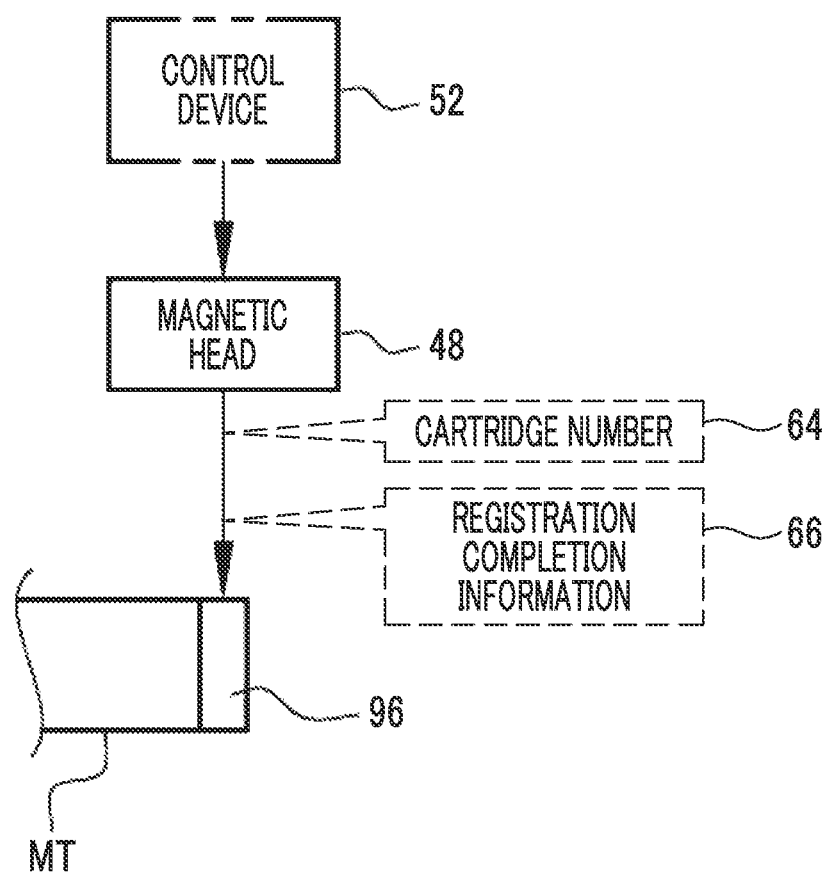
FIG. 27 is a conceptual diagram showing an example of an aspect where a cartridge number and registration completion information are written to a BOT region.

In the embodiment, although the NVM 128 of the cartridge memory 19 has been described as a storage medium in the cartridge 20, a storage destination of the cartridge number 64 and the registration completion information 66 is not limited to the NVM 128. As shown in FIG. 27 as an example, the control device 52 may control the operation of the magnetic head 48, thereby writing the cartridge number 64 and the registration completion information 66 to a BOT region 96 provided at the head of the magnetic tape MT.

In this way, in a case where the cartridge number 64 and the registration completion information 66 are written to the BOT region 96, the control device 52 controls the operation of the magnetic head 48, thereby reading the cartridge number 64 and the registration completion information 66 from the BOT region 96. The BOT region 96 is an example of "a part of a magnetic tape" according to the technique of the present disclosure. The BOT region 96 where cartridge number 64 and the registration completion information 66 are stored is an example of a "second storage medium" according to the technique of the present disclosure.

In the example shown in FIG. 27, although a form example where both the cartridge number 64 and the registration completion information 66 are written to the BOT region 96 has been shown, the technique of the present disclosure is not limited thereto. For example, one of the cartridge number 64 and the registration completion information 66 may be written to the BOT region 96, and the other one of the cartridge number 64 and the registration completion information 66 may be written to the NVM 128 of the cartridge memory 19.

The manufacturer of the cartridge 20 may ship the cartridge 20 after the cartridge number 64 and/or the registration completion information 66 are stored in the BOT region 96 with the magnetic tape drive 30 installed in the factory.

Instead of or in addition to the BOT region 96, the cartridge number 64 and/or the registration completion information 66 may be stored in an EOT region (not shown) provided at the rear of the magnetic tape MT. The position where the cartridge number 64 and/or the registration completion information 66 is stored is not limited to the BOT region 96 and the EOT region of the magnetic tape MT, and for example, the cartridge number 64 and/or the registration completion information 66 may be included in the mark 21 given to the cartridge 20.

In the embodiment, although description has been given using the cartridge number 64 as an example of the identification information for identifying the cartridge 20, the identification information is not limited to the cartridge number 64. Any identification information may be used as long as the identification information is information for identifying the cartridge 20, and may be, for example, a serial number that is given to the cartridge 20 in advance.

In the embodiment, an example where the CPU 76 of the library controller 14 makes the ASIC 98 included in the control device 52 of the magnetic tape drive 30 execute the registration processing and the access processing by outputting various request signals to the magnetic tape library 12 has been described. Note that the embodiment of the registration processing is not limited thereto. For example, instead of the ASIC 98 of the control device 52, the CPU 76 of the library controller 14 may directly control the magnetic tape drive 30. In this case, the control device 52 is not required, and a reduction in size of the magnetic tape drive 30 and a decrease in product cost are achieved compared to a case where the magnetic tape drive 30 includes the control device 52.

In the embodiment, in a case of executing the registration processing on the unregistered cartridge 20, determination is made whether or not the registration completion information 66 is stored in the cartridge 20, and in a case where the registration completion information 66 is not stored, the unregistered cartridge 20 determines that the cartridge 20 is a new cartridge 20, stores the identification information and the registration completion information 66 allocated to the cartridge 20 in the cartridge 20 in an overwriting prohibition state, and stores the identification information in the cartridge table 34 in the storage 18. On the other hand, in a case of executing the access processing of the user data to the cartridge 20, the library controller 14 compares the identification information stored in the cartridge 20 as a target for reading and writing of the user data with the identification information stored in the cartridge table 34 in the storage 18, and performs reading and writing of the user data from and to the cartridge 20 only in a case where both the identification information coincide with each other. Among the used cartridges 20, there is the cartridge 20 that leaks to the outside against the intention of an owner of the cartridge 20 for a reason, such as robbery or forgetting. Note that, even though the used cartridge 20 is reused in the separate cartridge management system 10 different from the cartridge management system 10 as a leakage source, the registration completion information 66 registered in the cartridge management system 10 as a leakage source is stored in the used cartridge 20. Accordingly, identification information newly allocated to the used cartridge 20 in the separate cartridge management system 10 is not stored in the used cartridge 20, and the identification information registered in the cartridge management system 10 as a leakage source is continuously stored in the used cartridge 20. On the other hand, since the identification information allocated to the used cartridge 20 by the separate cartridge management system 10 is stored in the cartridge table 34, the identification information stored in the used cartridge 20 is different from the identification information stored in the cartridge table 34. Accordingly, the library controller 14 performs control such that reading and writing of the user data from and to the used cartridge 20 are not performed. According to the configuration, it is possible to restrain unauthorized reuse of the cartridge 20 compared to a case where only the identification information is stored in the cartridge 20.

In the embodiment, in a case of executing the registration processing of the cartridge 20, the identification information is acquired by making the mark reading sensor 29 in the transport mechanism 28 read the mark 21 given to the case 36 of the cartridge 20. On the other hand, the content of the identification information included in the mark 21 is decided by the manager. Therefore, according to the configuration, the manager can store convenient identification information to manage the cartridge 20 in the cartridge 20 and the storage 18 by giving the mark 21 to the case 36 of the cartridge 20.

In a case where the manager acquires the identification information from the mark 21 originally given to the used cartridge 20 and stores the same identification information as the identification information stored in the used cartridge 20, in the storage 18, there is a case where the user data can be read out from the used cartridge 20 in an unauthorized manner. Note that, in a case where the mark 21 that is read by the mark reading sensor 29 in the transport mechanism 28 is different for each cartridge management system 10, in the cartridge management system 10 that is about to newly register the used cartridge 20, the identification information cannot be acquired from the mark 21 given in the cartridge management system 10 as a leakage source of the used cartridge 20. Therefore, according to the configuration, it is possible to restrain unauthorized reuse of the cartridge 20 compared to a case where a common mark 21 is used in each cartridge management system 10.

In the embodiment, the registration processing and the access processing of the user data to the cartridge 20 can be executed using the identification information issued by the manufacturer of the cartridge 20. That is, the manufacturer of the cartridge 20 can allocate the unified identification information that is managed in an integrated manner, to the cartridge 20. Therefore, according to the configuration, the manufacturer of the cartridge 20 easily performs product management of the shipped cartridge 20 compared to a case where the individual manager allocates the identification information to the cartridge 20.

In the embodiment, the registration processing and the access processing of the user data to the cartridge 20 can be executed using the identification information issued by the manufacturer of the cartridge 20 through the communication line 17 to which the manufacturer computer 11 is connected. Since the identification information is issued from the manufacturer of the cartridge 20 through the communication line 17, the manager can acquire the identification information at a timing at which the identification information is required. Therefore, according to the configuration, the library controller 14 can improve work efficiency until the manager sets about the registration processing compared to a case where the manager obtains the identification information of the cartridge 20 from the manufacturer of the cartridge 20 by mail.

In the embodiment, the encrypted identification information is stored in the second storage medium. Therefore, according to the configuration, since the identification information is hardly decrypted compared to a case where the identification information is stored in plain text, the cartridge 20 is hardly reused in an unauthorized manner.

In the embodiment, after the first registration unit 81 stores the identification information in the second storage medium in plain text, the overwriting prohibition setting unit 82 encrypts the identification information stored in the second storage medium. Therefore, according to the configuration, it is possible to separately process the processing of storing the identification information in the second storage medium and the processing of encrypting the stored identification information.

In the embodiment, the cartridge memory 19 has the NVM 128 where reading and writing of data are performed by the noncontact reading and writing device 50 in a noncontact manner. Therefore, according to the configuration, the identification information and/or the registration completion information 66 can be stored in the cartridge memory 19 without causing physical damage, compared to a case where reading and writing of data are performed to any memory in a contact manner.

In the embodiment, the identification information and/or the registration completion information 66 is stored even in the BOT region 96 and/or the EOT region of the magnetic tape MT housed in the cartridge 20. For example, in a case where the identification information and the registration completion information 66 are stored in both the NVM 128 and the BOT region 96, the identification information and the registration completion information 66 stored in the NVM 128 and the identification information and the registration completion information 66 stored in the BOT region 96 are applied to each other, whereby it is possible to make sure the reliability of the identification information and the registration completion information 66. Even though a defect occurs in any one of the NVM 128 or the BOT region 96, the identification information and the registration completion information 66 can be obtained from the other one.

Figure 28:
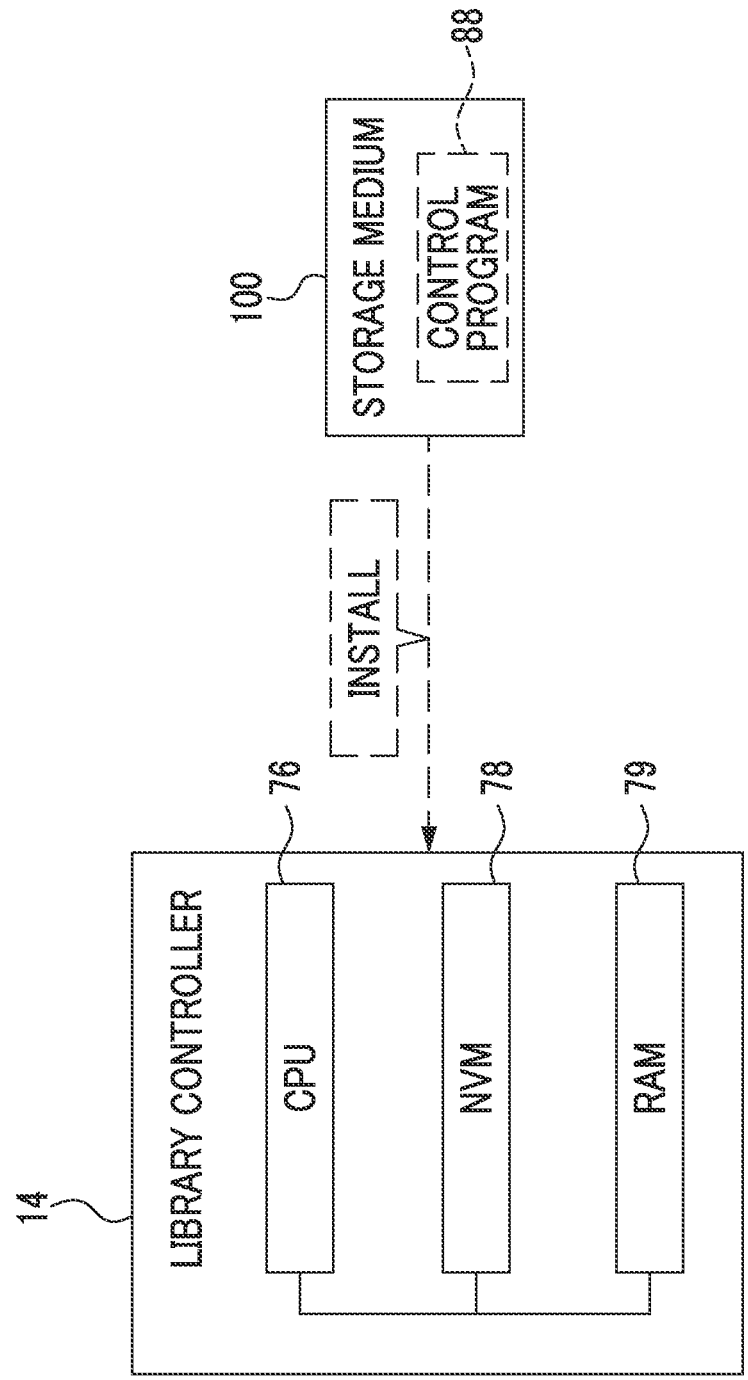
FIG. 28 is a block diagram showing an example of an aspect where a control program is installed on the library controller from a storage medium in which programs are stored.

In the above-described embodiment, as shown in FIG. 11, although a form example where the control program 88 is stored in the NVM 78 has been described, the technique of the present disclosure is not limited thereto. As shown in FIG. 28 as an example, the control program 88 may be stored in a storage medium 100.

The storage medium 100 is a non-transitory computer readable storage medium. An example of the storage medium 100 includes any portable storage medium, such as an SSD or a USB memory. The control program 88 that is stored in the storage medium 100 is installed on the library controller 14. The CPU 76 executes the registration preparation processing 70, the first registration processing 71, the overwriting prohibition processing 72, the second registration processing 73, and the data processing 74 following the control program 88. In the example shown in FIG. 28, the CPU 76 is a single CPU, but may be a plurality of CPUs.

Alternatively, the control program 88 may be stored in a storage unit of an external device (not shown) that is connected to the communication line 17 shown in FIG. 26, and the control program 88 may be downloaded by way of the host computer 16 and may be installed on the library controller 14 in response to a request from the library controller 14. The communication line 17 may be connected even to the library controller 14, whereby the control program 88 downloaded directly from the external device to the library controller 14 without passing through the host computer 16 may be installed on the library controller 14.

In the example shown in FIG. 28, although the library controller 14 has been described, the technique of the present disclosure is not limited thereto, and a device including an ASIC, an FPGA, and/or a PLD may be applied instead of the library controller 14. Instead of the library controller 14, a combination of a hardware configuration and a software configuration may be used.

As hardware resources for executing the registration processing and the access processing, various processors described below can be used. Examples of the processor include a CPU that is a general-use processor configured to execute software, that is, a program to function as the hardware resources for executing the registration processing and the access processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the registration processing and the access processing.

The hardware resources for executing the registration processing and the access processing may be configured with one of various processors or may be configured with a combination of two or more processors (for example, a combination of a plurality of FPGAs or a combination of a CPU and an FPGA) of the same type or different types. The hardware resources for executing the registration processing and the access processing may be one processor.

As an example of a configuration with one processor, first, as represented by a computer a form in which one processor is configured with one or more CPUs and software, and the processor functions as the hardware sources for executing the registration processing and the access processing is available. Second, as represented by SoC or the like, a form in which the functions of the entire system including a plurality of hardware resources for executing the registration processing and the access processing are realized in one IC chip is available. In this way, the registration processing and the access processing are realized using one or more of various processors described above as the hardware resources.

In addition, as the hardware structures of various processors, more specifically, an electric circuit into which circuit elements, such as semiconductor elements, are combined can be used. The registration processing and the access processing described above are merely an example. Therefore, it is needless to say that unnecessary steps may be deleted, new steps may be added, or a processing order may be rearranged without departing from the spirit and scope of the present disclosure.

In the technique of the present disclosure, various embodiments and/or various modification examples described above can also be appropriately combined. The technique of the present disclosure is not limited to the above-described embodiments, and various configurations can be of course employed without departing from the spirit and scope of the technique of the present disclosure. The technique of the present disclosure also extends to a storage medium that stores the program in a non-transitory manner, in addition to the program.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or portions may be replaced in the above-described contents and the illustrated contents without departing from the spirit and scope of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A cartridge management device comprising:
    a processor; and
    a first storage medium,
    wherein the processor is configured to:
        execute first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium;
        execute overwriting prohibition processing of prohibiting overwriting to the identification information and the registration completion information registered in the second storage medium through the first registration processing;
        execute second registration processing of registering the identification information in the first storage medium; and
        execute execution processing of executing at least one of reading or writing of user data from or to the magnetic tape cartridge in a case where the identification information stored in the first storage medium coincides with the identification information stored in the second storage medium.

2. The cartridge management device according to claim 1, wherein the processor is configured to:
    acquire the identification information from a mark given to a housing of the magnetic tape cartridge, and
    execute the first registration processing, the overwriting prohibition processing, the second registration processing, and the execution processing using the identification information acquired from the mark.

3. The cartridge management device according to claim 2, wherein the mark is different for each cartridge management system.

4. The cartridge management device according to claim 1, wherein the processor is configured to execute the first registration processing, the overwriting prohibition processing, the second registration processing, and the execution processing using the identification information issued by a manufacturer of the magnetic tape cartridge.

5. The cartridge management device according to claim 4, wherein the processor is configured to execute the first registration processing, the overwriting prohibition processing, the second registration processing, and the execution processing using the identification information issued by the manufacturer of the magnetic tape cartridge through a communication line.

6. The cartridge management device according to claim 1, wherein the first registration processing includes processing of encrypting the identification information and registering the encrypted identification information in the second storage medium.

7. The cartridge management device according to claim 1, wherein the overwriting prohibition processing includes processing of encrypting the identification information and prohibiting overwriting to the encrypted identification information.

8. The cartridge management device according to claim 1, wherein:
    the magnetic tape cartridge has a noncontact communication medium that is communicable with a communication device in a noncontact manner, and
    the second storage medium includes a memory mounted in the noncontact communication medium.

9. The cartridge management device according to claim 1, wherein:
    a magnetic tape is housed in the magnetic tape cartridge, and
    the second storage medium includes a part of the magnetic tape.

10. A cartridge management system comprising:
    the cartridge management device according to claim 1; and
    the magnetic tape cartridge.

11. A method for operating a cartridge management system including a first storage medium, the method comprising:
    executing first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium;
    executing overwriting prohibition processing of prohibiting overwriting to the identification information and the registration completion information registered in the second storage medium through the first registration processing;
    executing second registration processing of registering the identification information in the first storage medium; and executing execution processing of executing at least one of reading or writing of user data from or to the magnetic tape cartridge in a case where the identification information stored in the first storage medium coincides with the identification information stored in the second storage medium.

12. A non-transitory computer readable storage medium storing a program that causes a computer applied to a cartridge management system including a first storage medium to execute a process, the process comprising:

executing first registration processing of, in a case where registration completion information indicating registration completion in a cartridge management system is not stored in a second storage medium provided in a magnetic tape cartridge, registering identification information for identifying the magnetic tape cartridge and the registration completion information in the second storage medium;

executing overwriting prohibition processing of prohibiting overwriting to the identification information and the registration completion information registered in the second storage medium through the first registration processing;

executing second registration processing of registering the identification information in the first storage medium; and executing execution processing of executing at least one of reading or writing of user data from or to the magnetic tape cartridge in a case where the identification information stored in the first storage medium coincides with the identification information stored in the second storage medium.

\* \* \* \* \*